(12) United States Patent
Nishimura et al.

(10) Patent No.: US 12,465,988 B2
(45) Date of Patent: Nov. 11, 2025

(54) BRAZING METHOD AND BRAZING APPARATUS FOR BRAZING METAL PLATES

(71) Applicant: TOYOTA JIDOSHA KABUSHIKI KAISHA, Toyota (JP)

(72) Inventors: Akihisa Nishimura, Chiryu (JP); Toru Sugiyama, Nagakute (JP); Koji Kasahara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/432,910

(22) Filed: Feb. 5, 2024

(65) Prior Publication Data

US 2024/0261883 A1    Aug. 8, 2024

(30) Foreign Application Priority Data

Feb. 7, 2023    (JP) .................................. 2023-017116

(51) Int. Cl.
  *B23K 3/00*    (2006.01)
  *B23K 3/04*    (2006.01)
  *B23K 3/08*    (2006.01)

(52) U.S. Cl.
  CPC .............. *B23K 3/04* (2013.01); *B23K 3/085* (2013.01)

(58) Field of Classification Search
  CPC ........ B23K 3/04; B23K 3/085; B23K 1/0008; B23K 37/003; B23K 2101/045; B23K 1/008; B23K 3/00; B23K 1/00; B23K 3/08

USPC ... 228/6.1, 47.1, 49.1, 49.4, 218–221, 235.1
See application file for complete search history.

(56) References Cited

U.S. PATENT DOCUMENTS

| | | | | |
|---|---|---|---|---|
| 3,001,274 A | * | 9/1961 | Price | B23K 1/0014 427/205 |
| 3,011,254 A | * | 12/1961 | Melill | B23K 1/0014 428/116 |
| 3,412,917 A | * | 11/1968 | Omley | B23K 1/0014 228/44.3 |
| 4,294,419 A | * | 10/1981 | Fouse | B21D 26/055 244/119 |
| 5,504,296 A | | 4/1996 | Sato et al. | |
| 5,599,472 A | * | 2/1997 | Brown | B29C 66/54 219/645 |
| 5,645,744 A | * | 7/1997 | Matsen | B29C 66/91443 219/645 |
| 5,687,900 A | * | 11/1997 | Zaccone | B21D 26/055 228/173.6 |

(Continued)

FOREIGN PATENT DOCUMENTS

| | | | | |
|---|---|---|---|---|
| CN | 1265133 A | * | 8/2000 | ........... B21D 22/201 |
| CN | 1790880 A | * | 6/2006 | ........... B23K 1/0008 |

(Continued)

Primary Examiner — Kiley S Stoner
(74) Attorney, Agent, or Firm — Sughrue Mion, PLLC

(57) ABSTRACT

A brazing method for brazing metal pieces together via a brazing material includes the step of, in a heating chamber controlled to a preset oxygen concentration or less, sandwiching a workpiece of which the metal plates are stacked via the brazing material between a first heating plate and a second heating plate in such a manner that the first heating plate and the second heating plate cover the workpiece entirely as viewed in a thickness direction of the workpiece, and heating the workpiece to braze the metal plates together via the brazing material.

7 Claims, 20 Drawing Sheets

(56) References Cited

U.S. PATENT DOCUMENTS

| | | | | |
|---|---|---|---|---|
| 5,823,034 A | * | 10/1998 | Nelepovitz | B21D 26/055 |
| | | | | 72/60 |
| 5,941,446 A | * | 8/1999 | Yasui | B23K 31/02 |
| | | | | 29/889.72 |
| 11,370,070 B1 | * | 6/2022 | Oo | B23K 35/0244 |
| 2006/0108357 A1 | * | 5/2006 | Wang | B23K 1/005 |
| | | | | 219/628 |
| 2012/0318856 A1 | * | 12/2012 | Hirakawa | H01L 21/67173 |
| | | | | 228/221 |
| 2024/0261883 A1 | * | 8/2024 | Nishimura | B23K 1/008 |

FOREIGN PATENT DOCUMENTS

| | | | | | |
|---|---|---|---|---|---|
| CN | 102958643 A | * | 3/2013 | | B23K 26/0876 |
| CN | 108350566 A | * | 7/2018 | | B23K 20/023 |
| CN | 109604410 A | * | 4/2019 | | |
| CN | 111715964 A | * | 9/2020 | | |
| CN | 112719081 A | * | 4/2021 | | B21D 37/10 |
| CN | 113458580 A | * | 10/2021 | | |
| CN | 215544211 U | * | 1/2022 | | B21D 37/10 |
| CN | 111872508 B | * | 7/2022 | | B23K 1/008 |
| DE | 102017109748 A1 | * | 11/2018 | | B23K 1/0016 |
| EP | 1658922 A1 | * | 5/2006 | | B23K 1/0008 |
| EP | 1847792 A1 | * | 10/2007 | | B23K 20/02 |
| EP | 3865664 A1 | * | 8/2021 | | B22D 19/16 |
| JP | 6-91367 A | | 4/1994 | | |
| JP | 2005026608 A | * | 1/2005 | | B23K 20/023 |
| JP | 4326110 B2 | * | 9/2009 | | |
| KR | 1887151 B1 | * | 8/2018 | | B23K 20/023 |
| KR | 101887151 B1 | * | 8/2018 | | |
| WO | WO-2014020286 A1 | * | 2/2014 | | B23K 1/0018 |
| WO | WO-2019151315 A1 | * | 8/2019 | | B23K 1/0012 |

* cited by examiner

FIG. 4
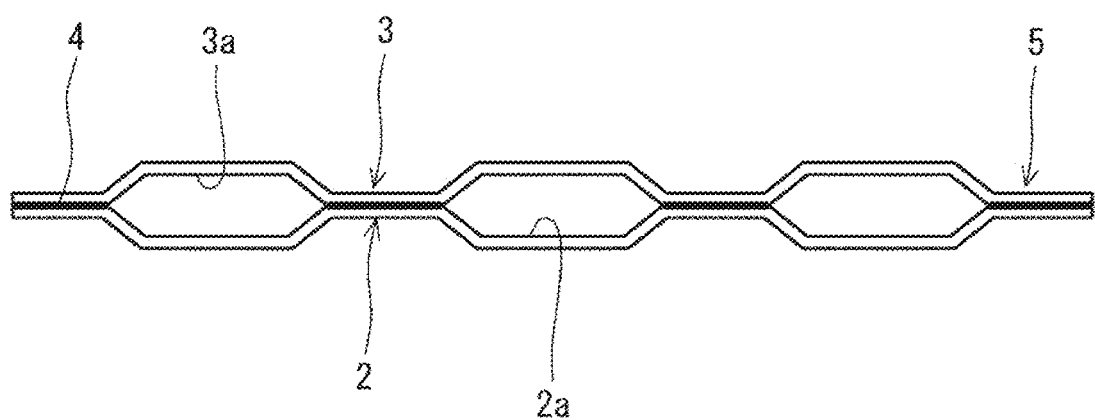
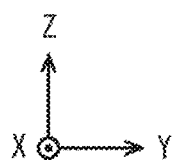

FIG. 11
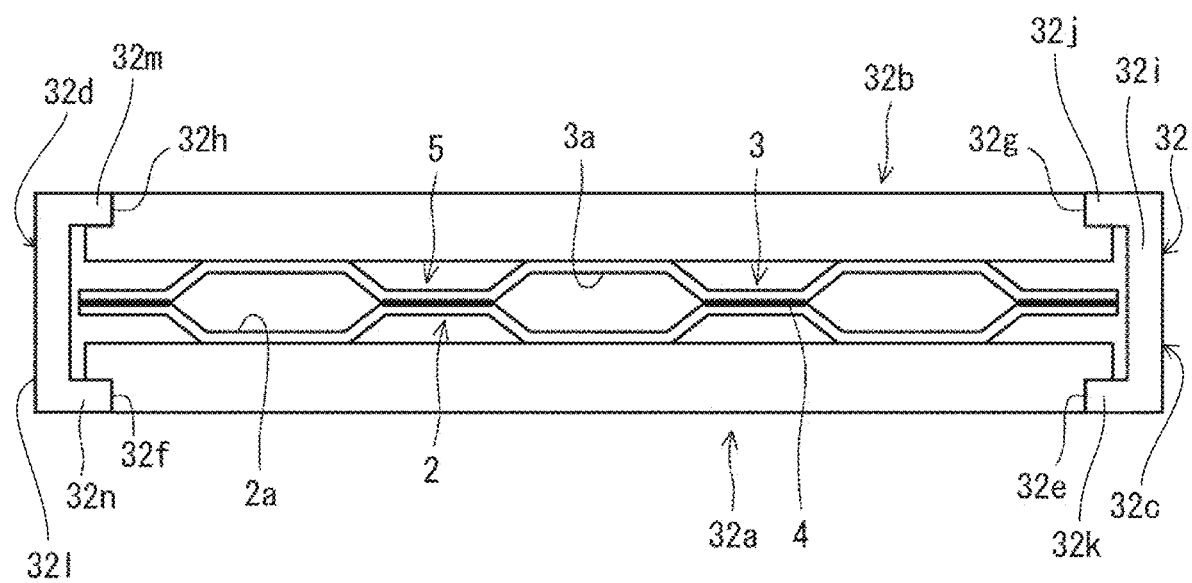
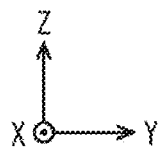

BRAZING METHOD AND BRAZING APPARATUS FOR BRAZING METAL PLATES

CROSS-REFERENCE TO RELATED APPLICATION

This application claims priority to Japanese Patent Application No. 2023-017116 filed on Feb. 7, 2023, incorporated herein by reference in its entirety.

BACKGROUND

1. Technical Field

The present disclosure relates to brazing methods and brazing apparatuses for brazing metal plates.

2. Description of Related Art

For example, in a heat welding method for welding aluminum materials together by heat as disclosed in Japanese Unexamined Patent Application Publication No. H06-91367 (JP H06-91367 A), brazing is performed as follows. A brazing material is interposed between portions of the aluminum materials that are to be brazed together. The portions of the aluminum materials with the brazing material therebetween are sandwiched between a pair of heat rollers, and the brazing material is melted by heat conduction from the heat rollers. The portions of the aluminum materials are thus brazed together. In this method, the heat rollers and the aluminum materials are relatively moved to move the heat rollers over the entire portions to be brazed.

SUMMARY

In the heat welding method disclosed in JP H06-91367 A, the portions of the aluminum materials that are to be brazed together are locally heated by the heat rollers. However, due to high heat conduction of the aluminum materials, heat supplied from the heat rollers diffuses throughout the entire aluminum materials even if the aluminum materials are locally heated by the heat rollers. It is therefore difficult to braze the aluminum materials together.

The present disclosure provides a highly feasible brazing method and brazing apparatus for brazing metal plates.

A brazing method for brazing metal plates according to one aspect of the present disclosure is a brazing method for brazing metal plates together via a brazing material. The brazing method includes the step of: in a heating chamber controlled to a preset oxygen concentration or less, sandwiching a workpiece of which the metal plates are stacked via the brazing material between a first heating plate and a second heating plate in such a manner that the first heating plate and the second heating plate cover the workpiece entirely as viewed in a thickness direction of the workpiece, and heating the workpiece to braze the metal plates together via the brazing material.

The brazing method according to the above aspect may further include the steps of: loading the workpiece into a preliminary chamber that is continuous with the heating chamber via a first opening and closing unit; with the first opening and closing unit closed, controlling the preliminary chamber to the oxygen concentration or less; with the first opening and closing unit closed, controlling the heating chamber to the oxygen concentration or less; and with the preliminary chamber and the heating chamber controlled to the oxygen concentration or less, opening the first opening and closing unit to load the workpiece into the heating chamber and heat the workpiece.

The brazing method according to the above aspect may further include the step of loading the brazed workpiece into a cooling chamber via a second opening and closing unit, sandwiching the workpiece between a first cooling plate and a second cooling plate in such a manner that the first cooling plate and the second cooling plate cover the entire workpiece as viewed in the thickness direction of the workpiece, and cooling the workpiece, the cooling chamber being located on an opposite side of the heating chamber from the preliminary chamber.

The brazing method according to the above aspect may further include the steps of: holding both end portions of the workpiece by a holding unit inside the heating chamber and placing the workpiece between the first heating plate and the second heating plate in such a manner that the workpiece does not contact the first heating plate and the second heating plate, the end portions of the workpiece being end portions in a direction perpendicular to the thickness direction of the workpiece and perpendicular to a direction in which the workpiece is loaded into the heating chamber; and with the both end portions of the workpiece held by the holding unit, sandwiching and heating the workpiece between the first heating plate and the second heating plate.

The brazing method according to the above aspect may further include the steps of: sandwiching and restraining the workpiece between a first restraining plate and a second restraining plate in the thickness direction of the workpiece; loading the workpiece sandwiched between the first restraining plate and the second restraining plate into the heating chamber; and sandwiching and heating the workpiece sandwiched between the first restraining plate and the second restraining plate between the first heating plate and the second heating plate via the first restraining plate and the second restraining plate.

The brazing method according to the above aspect may further include the step of when loading the workpiece into the heating chamber, bringing the workpiece into contact with a positioning unit and positioning the workpiece with respect to the first heating plate, the positioning unit being located inside the heating chamber.

A brazing apparatus for brazing metal plates according to another aspect of the present disclosure is a brazing apparatus for brazing metal plates together via a brazing material. The brazing apparatus includes: a heating chamber into which a workpiece, of which the metal plates are stacked via the brazing material, is loaded; a first deoxidizing device configured to remove oxygen from the heating chamber; and a first heating plate and a second heating plate that are located inside the heating chamber. The brazing apparatus is configured to, with the heating chamber controlled to a preset oxygen concentration or less, sandwich the workpiece between the first heating plate and the second heating plate in such a manner that the first heating plate and the second heating plate cover the entire workpiece as viewed in a thickness direction of the workpiece, and heat the workpiece to braze the metal plates together via the brazing material.

The brazing apparatus according to the above aspect may further include: a preliminary chamber that is continuous with the heating chamber; a first opening and closing unit located between the preliminary chamber and the heating chamber; a second deoxidizing device configured to remove oxygen from the preliminary chamber; and a conveying device configured to convey the workpiece. The brazing apparatus may be configured to, with both the preliminary chamber in which the workpiece is loaded therein and the heating chamber controlled to the preset oxygen concentration or less, open the first opening and closing unit to load the workpiece into the heating chamber.

The brazing apparatus according to the above aspect may further include: a cooling chamber that is located on an opposite side of the heating chamber from the preliminary chamber and into which the brazed workpiece is to be loaded; a second opening and closing unit located between the heating chamber and the cooling chamber; and a first cooling plate and a second cooling plate that are located inside the cooling chamber. The brazing apparatus may be configured to sandwich the workpiece between the first cooling plate and the second cooling plate in such a manner that the first cooling plate and the second cooling plate cover the entire workpiece as viewed in the thickness direction of the workpiece, and cool the workpiece.

In the brazing apparatus according to the above aspect, each of the first heating plate and the second heating plate may include a single-piece formed graphite plate and a heater mounted inside the graphite plate.

The brazing apparatus according to the above aspect may further include a holding unit located inside the heating chamber and configured to hold both end portions of the workpiece, the both end portions of the workpiece being end portions in a direction perpendicular to the thickness direction of the workpiece and perpendicular to a direction in which the workpiece is loaded into the heating chamber. When the holding unit holds the both end portions of the workpiece, the workpiece may be placed between the first heating plate and the second heating plate without contacting the first heating plate and the second heating plate.

The brazing apparatus according to the above aspect may further include a positioning unit configured to position the workpiece inside the heating chamber.

The brazing apparatus according to the above aspect may further include a first restraining plate and a second restraining plate that are configured to sandwich and restrain the workpiece between the first restraining plate and the second restraining plate. With the workpiece sandwiched between the first restraining plate and the second restraining plate, the first restraining plate and the second restraining plate may be loaded into the heating chamber.

In the brazing apparatus according to the above aspect, the first restraining plate and the second restraining plate may have a thermal conductivity equal to or greater than a thermal conductivity of iron and a heat capacity equal to or greater than a heat capacity of aluminum.

The present disclosure provides a highly feasible brazing method and brazing apparatus for brazing metal plates.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a YZ sectional view of the representative example of the workpiece;

FIG. 11 is a YZ sectional view of the workpiece clamped by a restraining jig;

DETAILED DESCRIPTION OF EMBODIMENTS

Hereinafter, specific embodiments to which the present disclosure is applied will be described in detail with reference to the drawings. However, the present disclosure is not limited to the following embodiments. For the sake of clarity, the following description is given using a three-dimensional (xyz) coordinate system, and the following description and drawings are simplified as appropriate.

First Embodiment

Figure 1:
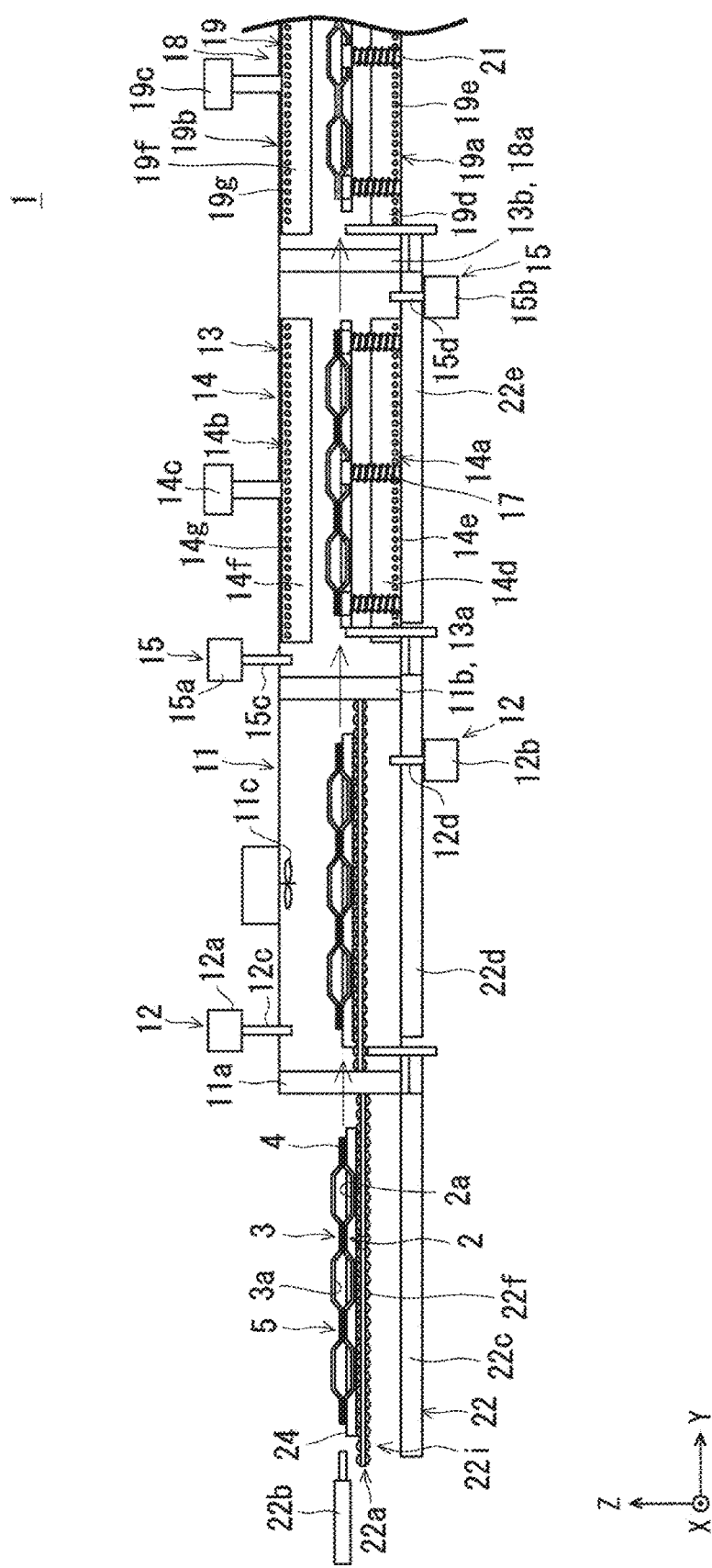
FIG. 1 illustrates the flow of brazing metal plates together using a brazing apparatus for brazing metal plates according to a first embodiment.
Figure 2:
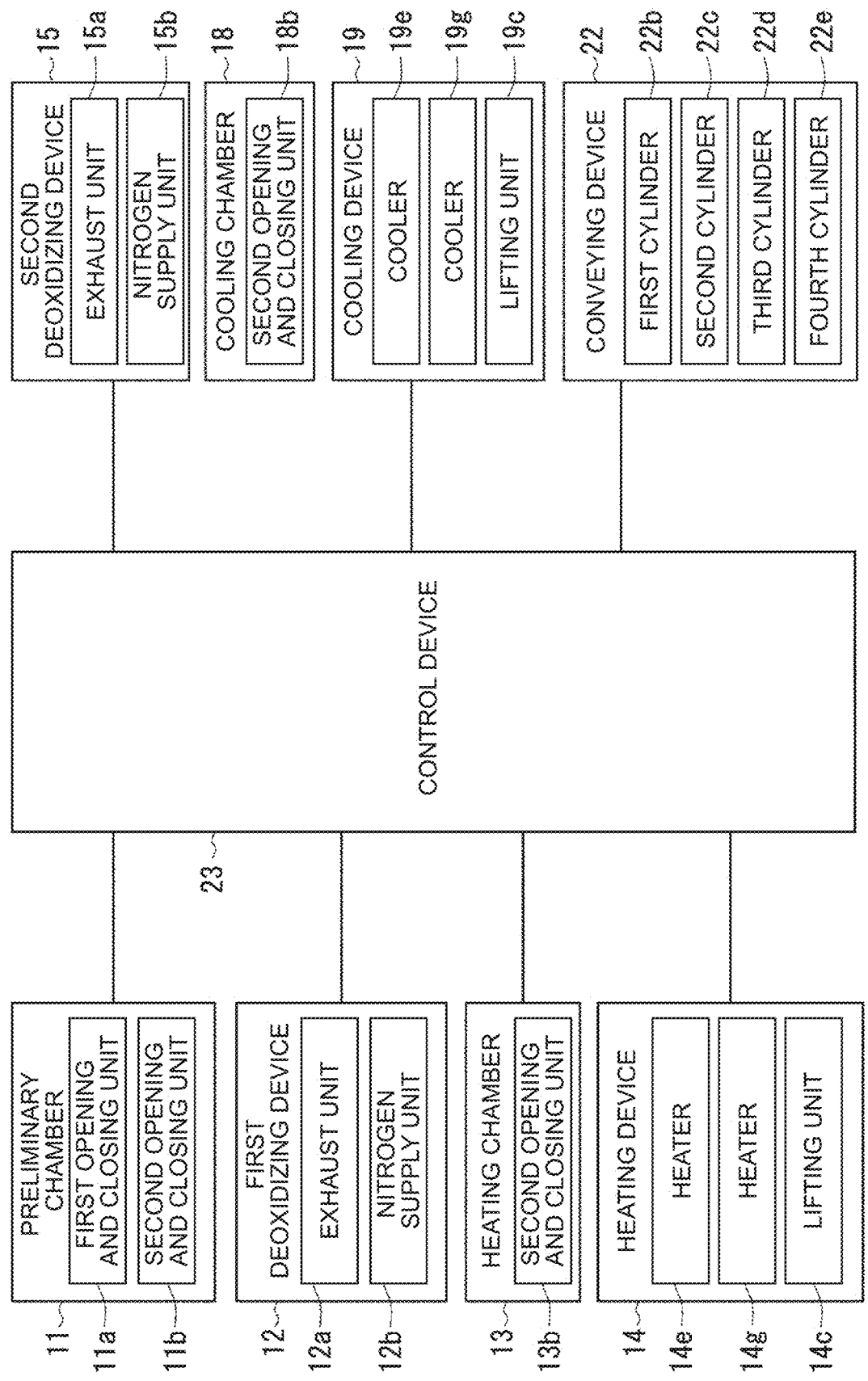
FIG. 2 is a block diagram showing the configuration of a control system of the brazing apparatus of the first embodiment.

First, the configuration of a brazing apparatus for brazing metal plates (hereinafter, sometimes simply referred to as brazing apparatus) according to a first embodiment will be described. FIG. 1 illustrates the flow of brazing metal plates together using the brazing apparatus of the present embodiment. FIG. 2 is a block diagram showing the configuration of a control system of the brazing apparatus of the present embodiment.

As shown in FIG. 1, a brazing apparatus 1 of the present embodiment is used to heat a workpiece 5, of which a first metal plate 2 and a second metal plate 3 are stacked via a brazing material 4, to braze the first metal plate 2 and the second metal plate 3 together.

Figure 3:
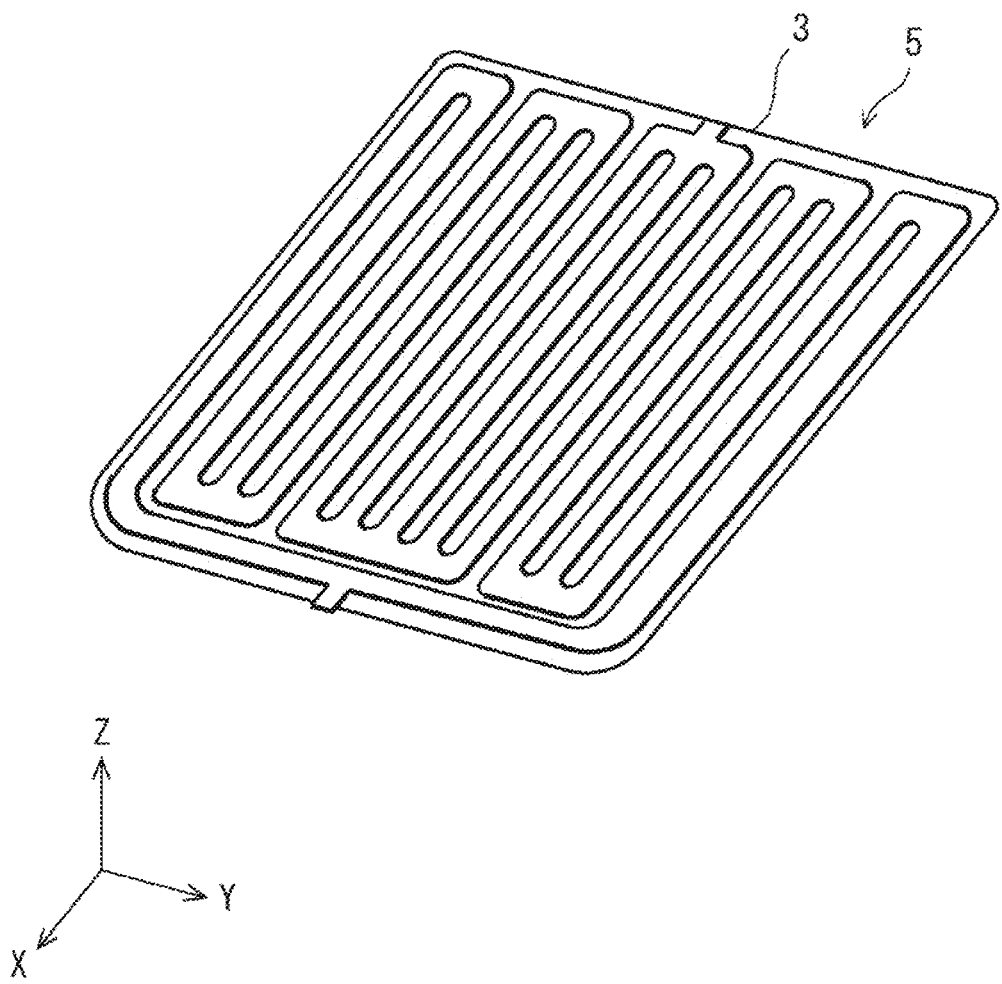
FIG. 3 is a perspective view showing a representative example of a workpiece.

FIG. 3 is a perspective view showing a representative example of the workpiece 5. FIG. 4 is a YZ sectional view of the representative example of the workpiece 5. For example, as shown in FIGS. 1, 3, and 4, the workpiece 5 has a substantially rectangular shape as viewed in the Z-axis direction, and is composed of the first metal plate 2 placed on the negative side of the Z-axis, the second metal plate 3 placed on the positive side of the Z-axis, and the brazing material 4 interposed between a portion of the first metal plate 2 that is to be brazed and a portion of the second metal plate 3 that is to be brazed.

The first metal plate 2 is a plate made of metal that is commonly brazed such as an aluminum material, and for example, has recessed portions 2a recessed toward the negative side of the Z-axis as shown in FIG. 4. The surfaces on the positive and negative sides of the Z-axis of the first metal plate 2 are flat surfaces substantially parallel to an XY plane.

The second metal plate 3 is a plate made of metal that is commonly brazed such as an aluminum material, and for example, has recessed portions 3a recessed toward the positive side of the Z-axis as shown in FIG. 4. The surfaces on the positive and negative sides of the Z-axis of the second metal plate 3 are flat surfaces substantially parallel to an XY plane.

The first metal plate 2 and the second metal plate 3 are stacked such that the surface on the positive side of the Z-axis of the first metal plate 2 and the surface on the negative side of the Z-axis of the second metal plate 3 face each other. The recessed portions 2a of the first metal plate 2 and the recessed portions 3a of the second metal plate 3 face each other so as to form a continuous void (e.g., a void for forming a cooling medium channel etc. when the workpiece 5 is later made into a product form).

The brazing material 4 is a metal having a lower melting point than the first metal plate 2 and the second metal plate 3, such as an aluminum alloy. Like brazing materials that are commonly used to braze metal plates together, the brazing material 4 contains, for example, flux.

As shown in FIG. 4, the brazing material 4 is placed between the surface on the positive side of the Z-axis of the first metal plate 2 and the surface on the negative side of the Z-axis of the second metal plate 3. In other words, the surface on the positive side of the Z-axis of the first metal plate 2 and the surface on the negative side of the Z-axis of the second metal plate 3 form a portion to be brazed.

For example, the portion to be brazed is preferably long in the X-axis or Y-axis direction that is a direction perpendicular to the thickness direction of the first and second metal plates 2, 3 (e.g., the Z-axis direction) and is preferably located over a wide area of the first and second metal plates 2, 3 as viewed in the Z-axis direction. The above shape of the workpiece 5 is illustrative, and the shape of the workpiece 5 is not limited to this.

Figure 5:
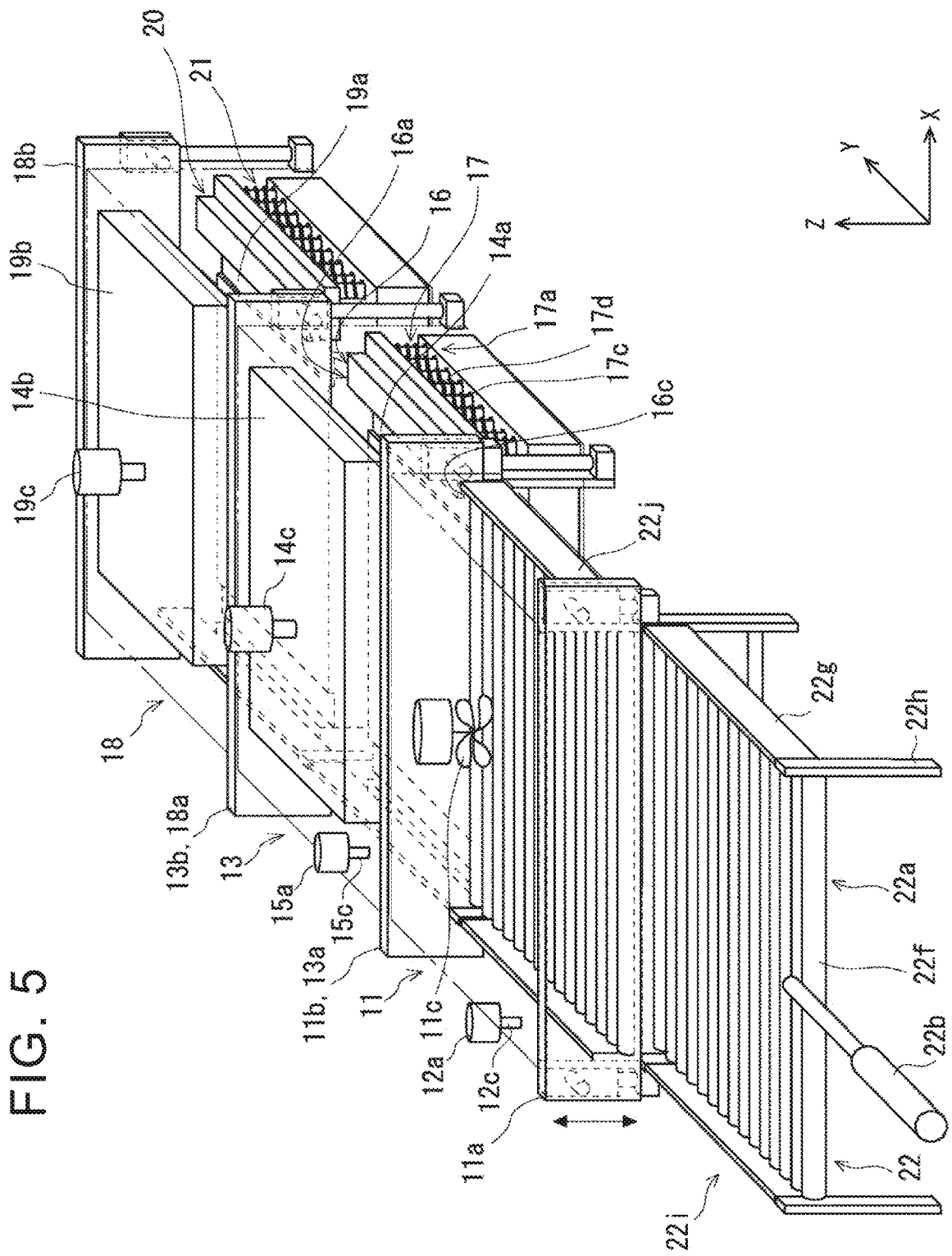
FIG. 5 is a perspective view showing a preliminary chamber, a heating chamber, a cooling chamber, etc. in the brazing apparatus of the first embodiment.

FIG. 5 is a perspective view showing a preliminary chamber, a heating chamber, a cooling chamber, etc. in the brazing apparatus of the present embodiment. As shown in FIGS. 1, 2, and 5, the brazing apparatus 1 includes a preliminary chamber 11, a first deoxidizing device 12, a heating chamber 13, a heating device 14, a second deoxidizing device 15, a first holding mechanism 16, a first support mechanism 17, a cooling chamber 18, a cooling device 19, a second holding mechanism 20, a second support mechanism 21, a conveying device 22, and a control device 23.

The preliminary chamber 11 is a substantially sealable box. As shown in FIGS. 1, 2, and 5, the preliminary chamber 11 includes a first opening and closing unit 11a located on the negative side of the Y-axis of the preliminary chamber 11 and a second opening and closing unit 11b located on the positive side of the Y-axis of the preliminary chamber 11. For example, the first opening and closing unit 11a and the second opening and closing unit 11b are configured so that a door can be opened and closed by an opening and closing cylinder like a common chamber door opening and closing mechanism.

The first opening and closing unit 11a and the second opening and closing unit 11b may have any configuration as long as they can substantially seal the preliminary chamber 11 and open the preliminary chamber 11. As shown in FIGS. 1 and 5, the preliminary chamber 11 preferably includes a stirring unit 11c such as a fan in order to achieve a uniformly deoxidized state (uniform nitrogen concentration) inside the preliminary chamber 11.

The first deoxidizing device 12 remove oxygen from the preliminary chamber 11. As shown in FIG. 1, the first deoxidizing device 12 includes an exhaust unit 12a and a nitrogen supply unit 12b. The exhaust unit 12a is connected to the preliminary chamber 11 through an exhaust pipe 12c, and exhausts gas from the preliminary chamber 11. The nitrogen supply unit 12b is connected to the preliminary chamber 11 through a supply pipe 12d, and supplies nitrogen into the preliminary chamber 11.

Nitrogen is thus supplied into the preliminary chamber 11 by the nitrogen supply unit 12b while the gas inside the preliminary chamber 11 is exhausted by the exhaust unit 12a. Oxygen inside the preliminary chamber 11 is therefore removed by replacing the gas inside the preliminary chamber 11 with nitrogen. The first deoxidizing device 12 may have any configuration as long as it can remove oxygen from the preliminary chamber 11, and is not limited to the above configuration.

As shown in FIGS. 1 and 5, the heating chamber 13 is disposed on the positive side of the Y axis, namely on the side to which the workpiece 5 is conveyed, with respect to the preliminary chamber 11. The heating chamber 13 is a substantially sealable box, and is continuous with the preliminary chamber 11 in the Y-axis direction. The heating chamber 13 includes a first opening and closing unit 13a located on the negative side of the Y-axis of the heating chamber 13 and a second opening and closing unit 13b located on the positive side of the Y-axis of the heating chamber 13.

For example, as shown in FIG. 5, the first opening and closing unit 13a and the second opening and closing unit 13b are configured so that a door can be opened and closed by an opening and closing cylinder like a common chamber door opening and closing mechanism. However, the first opening and closing unit 13a and the second opening and closing unit 13b may have any configuration as long as they can substantially seal the heating chamber 13 and open the heating chamber 13.

The first opening and closing unit 13a can be the second opening and closing unit 11b of the preliminary chamber 11. That is, the second opening and closing unit 11b of the preliminary chamber 11 and the first opening and closing unit 13a of the heating chamber 13 are preferably a common opening and closing unit between the preliminary chamber 11 and the heating chamber 13.

As shown in FIG. 1, the heating device 14 includes a first heating plate 14a, a second heating plate 14b, and a lifting unit 14c. The first heating plate 14a is disposed inside the heating chamber 13 and fixed to the portion on the negative side of the Z-axis inside the heating chamber 13.

The first heating plate 14a includes a top plate (e.g., graphite plate) 14d with a high thermal conductivity and a low coefficient of thermal expansion and a heater 14e. The top plate 14d is a plate that comes into direct contact with the workpiece 5 to be brazed and rapidly heats the workpiece 5 by heat conduction. Therefore, the top plate 14d is desirably made of a material that easily conducts heat and is not distorted by heating.

The top plate 14d is large enough to cover the entire workpiece 5 as viewed in the Z-axis direction, and as shown in FIG. 1, the surface on the positive side of the Z-axis of the top plate 14d is a flat surface substantially parallel to an XY plane. For example, the top plate 14d is preferably a single-piece formed plate made of a lamination of carbon sheets, and has a substantially rectangular shape as viewed in the Z-axis direction.

As shown in FIG. 1, the heater 14e is mounted inside the top plate 14d. The heater 14e is, for example, a heating wire, and is preferably mounted in the portion on the negative side of the Z-axis of the top plate 14d.

Therefore, a portion of the top plate 14d that is located on the positive side of the Z-axis with respect to the heater 14e functions as a heat diffusion layer, so that the surface on the positive side of the Z-axis of the top plate 14d can have a substantially uniform temperature.

The heater 14e may have any configuration as long as it can heat the top plate 14d. For example, the heater 14e may be configured to circulate a heat source within a tube. The first heating plate 14a is preferably fixed to the portion on the negative side of the Z-axis inside the heating chamber 13 via a heat insulating material or a base material.

As shown in FIG. 1, the second heating plate 14b is disposed on the positive side of the Z-axis with respect to the first heating plate 14a inside the heating chamber 13. The second heating plate 14b includes a top plate 14f and a heater 14g. Since the second heating plate 14b has a configuration symmetrical with that of the first heating plate 14a with respect to the Y-axis as viewed in the X-axis direction, detailed description thereof will be omitted.

The lifting unit 14c moves the second heating plate 14b up and down in the Z-axis direction. The lifting unit 14c includes, for example, a cylinder, and is fixed to the portion on the positive side of the Z-axis of the heating chamber 13. A rod of the lifting unit 14c is fixed to the portion on the positive side of the Z-axis of the second heating plate 14b. The rod of the lifting unit 14c is preferably fixed to the second heating plate 14b via a heat insulating material or a base material.

The lifting unit 14c may have any configuration as long as it can move the second heating plate 14b up and down in the Z-axis direction. The first heating plate 14a and the second heating plate 14b preferably have guide pins passed therethrough in order to guide the second heating plate 14b when the second heating plate 14b is moved up and down in the Z-axis direction.

The second deoxidizing device 15 remove oxygen from the heating chamber 13. As shown in FIG. 1, the second deoxidizing device 15 includes an exhaust unit 15a connected to the heating chamber 13 through an exhaust pipe 15c, and a nitrogen supply unit 15b connected to the heating chamber 13 through a supply pipe 15d. Since the second deoxidizing device 15 has substantially the same configuration as the first deoxidizing device 12, detailed description thereof will be omitted.

Figure 6:
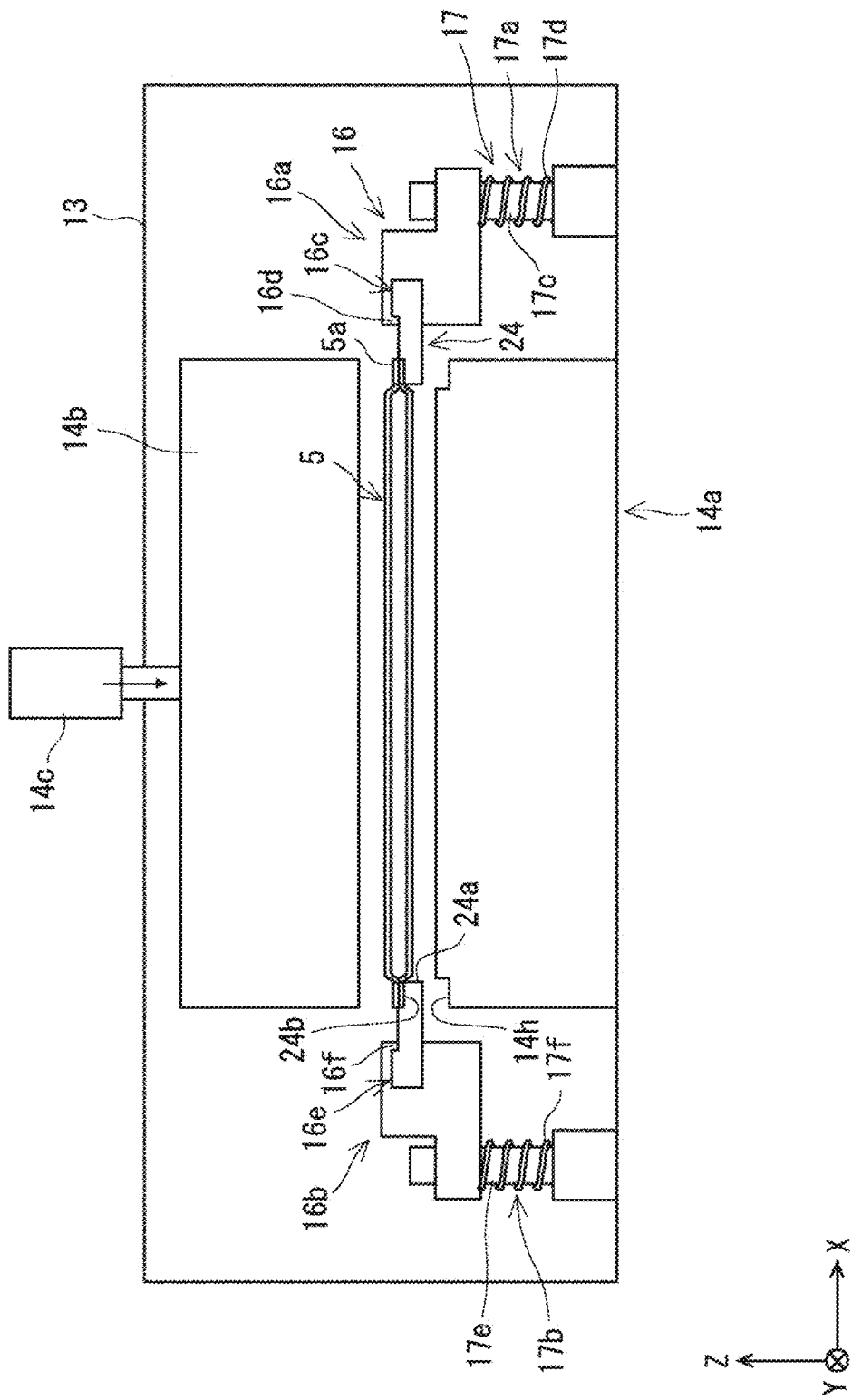
FIG. 6 shows the workpiece loaded into the heating chamber of the brazing apparatus of the first embodiment as viewed from the negative side of the Y-axis.

FIG. 6 shows the workpiece 5 loaded into the heating chamber 13 of the brazing apparatus 1 of the present embodiment as viewed from the negative side of the Y-axis. As shown in FIG. 6, the first holding mechanism 16 is disposed inside the heating chamber 13, and includes a first holding unit 16a and a second holding unit 16b. The first holding unit 16a is disposed on the positive side of the X-axis with respect to the first heating plate 14a.

As shown in FIG. 5, the first holding unit 16a is an elongated member extending in the Y-axis direction, and can be made of, for example, graphite. As shown in FIG. 6, the first holding unit 16a has a groove 16c in its end portion on the negative side of the X-axis. The groove 16c is open on the negative side of the X-axis and the positive and negative sides of the Y-axis, and extends in the Y-axis direction.

For example, as shown in FIG. 6, the groove 16c has a substantially rectangular shape as viewed in the Y-axis direction and is formed by being cut out from the first holding portion 16a. A guide wall 16d that protrudes from a corner on the negative side of the X-axis and the positive side of the Z-axis of the groove 16c in the first holding unit 16a to the negative side of the Z-axis and extends in the Y-axis direction, is provided.

As shown in FIG. 6, the second holding unit 16b is disposed on the negative side of the X-axis with respect to the first heating plate 14a, and includes a groove 16e and a guide wall 16f, both extending in the Y-axis direction. Since the second holding unit 16b has a configuration symmetrical with that of the first holding unit 16a with respect to the Z-axis as viewed in the Y-axis direction, detailed description thereof will be omitted.

As shown in FIG. 6, the first support mechanism 17 is disposed inside the heating chamber 13, and includes a first support unit 17a and a second support unit 17b. The first support unit 17a supports the first holding unit 16a in such a manner that the first holding unit 16a can move up and down in the Z-axis direction. The first support unit 17a includes guide pins 17c and elastic bodies 17d.

As shown in FIG. 6, the guide pins 17c are disposed at intervals in the Y-axis direction in a region on the positive side of the X-axis with respect to the first heating plate 14a. The guide pins 17c protrude from the heating chamber 13 toward the positive side of the Z-axis, and the portions on the positive side of the Z-axis of the guide pins 17c are passed through guide holes formed in the first holding unit 16a.

The elastic bodies 17d are, for example, coil springs. With the guide pins 17c inserted through the elastic bodies 17d, the elastic bodies 17d are disposed between the portion on the negative side of the Z-axis of the heating chamber 13 and the first holding unit 16a. The first support unit 17a thus biases the first holding unit 16a toward the positive side of the Z-axis and supports the first holding unit 16a while allowing the first holding unit 16a to move up and down in the Z-axis direction.

As shown in FIG. 6, when the first support mechanism 17 is in a normal state in which the elastic bodies 17d are not contracted, the first support unit 17a supports the first holding unit 16a such that the groove 16c in the first holding unit 16a is located on the positive side of the Z-axis with respect to the surface on the positive side of the Z-axis of the first heating plate 14a and is also located on the negative side of the Z-axis with respect to the surface on the negative side of the Z-axis of the second heating plate 14b located furthest on the positive side of the Z-axis.

As shown in FIG. 6, the second support unit 17b includes guide pins 17e and elastic bodies 17f, both located on the negative side of the X-axis with respect to the first heating plate 14a. Since the second support unit 17b has a configuration symmetrical with that of the first support unit 17a with respect to the Z-axis as viewed in the Y-axis direction, detailed description thereof will be omitted.

As shown in FIG. 1, the cooling chamber 18 is disposed on the positive side of the Y-axis with respect to the heating chamber 13. The cooling chamber 18 may be an open space or may be substantially sealable. For example, as shown in FIG. 5, the cooling chamber 18 preferably includes a first opening and closing unit 18a on the negative side of the Y-axis of the cooling chamber 18 and a second opening and closing unit 18b on the positive side of the Y-axis of the cooling chamber 18, and the second opening and closing unit 13b of the heating chamber 13 and the second opening and closing unit 18b of the cooling chamber 18 are preferably a common opening and closing unit between the heating chamber 13 and the cooling chamber 18.

The cooling device 19 includes a first cooling plate 19a, a second cooling plate 19b, and a lifting unit 19c. As shown in FIG. 1, the first cooling plate 19a is disposed inside the cooling chamber 18 and fixed to the portion on the negative side of the Z-axis inside the cooling chamber 18. The first cooling plate 19a includes a plate body 19d and a cooler 19e.

The plate body 19d is large enough to cover the entire workpiece 5 as viewed in the Z-axis direction, and as shown in FIG. 1, the surface on the positive side of the Z-axis of the plate body 19d is a flat surface substantially parallel to an XY plane. For example, the plate body 19d can be made of a material such as copper. The plate body 19d is preferably made of a material having a thermal conductivity equal to or higher than that of iron.

As shown in FIG. 1, the cooler 19e is mounted inside the plate body 19d. The cooler 19e may have any configuration as long as it can cool the plate body 19d. For example, the cooler 19e may be configured to circulate a cooling medium within a tube. The first cooling plate 19a is preferably fixed to the portion on the negative side of the Z-axis inside the cooling chamber 18 via a heat insulating material or a base material.

As shown in FIG. 1, the second cooling plate 19b is disposed on the positive side of the Z-axis with respect to the first cooling plate 19a inside the cooling chamber 18. The second cooling plate 19b includes a plate body 19f and a cooler 19g. Since the second cooling plate 19b has a configuration symmetrical with that of the first cooling plate 19a with respect to the Y-axis as viewed in the X-axis direction, detailed description thereof will be omitted.

The lifting unit 19c moves the second cooling plate 19b up and down in the Z-axis direction. The lifting unit 19c includes, for example, a cylinder, and is fixed to the portion on the positive side of the Z-axis of the cooling chamber 18. A rod of the lifting unit 19c is fixed to the portion on the positive side of the Z-axis of the second cooling plate 19b. The rod of the lifting unit 19c is preferably fixed to the second cooling plate 19b via a heat insulating material or a base material.

The lifting unit 19c may have any configuration as long as it can move the second cooling plate 19b up and down in the Z-axis direction. The first cooling plate 19a and the second cooling plate 19b preferably have guide pins passed therethrough in order to guide the second cooling plate 19b when the second cooling plate 19b is moved up and down in the Z-axis direction.

As shown in FIG. 5, the second holding mechanism 20 is disposed inside the cooling chamber 18. The second holding mechanism 20 includes: a first holding unit having a groove into which the end portion on the positive side of the X-axis of the workpiece 5 is to be inserted; and a second holding unit having a groove into which the end portion on the negative side of the X-axis of the workpiece 5 is to be inserted. Since the second holding mechanism 20 has substantially the same configuration as the first holding mechanism 16, detailed description thereof will be omitted.

As shown in FIG. 5, the second support mechanism 21 is disposed inside the cooling chamber 18. The second support mechanism 21 includes: a first support unit configured to support the first holding unit of the second holding mechanism 20 in such a manner that the first holding unit can move up and down in the Z-axis direction; and a second support unit configured to support the second holding unit of the second holding mechanism 20 in such a manner that the second holding unit can move up and down in the Z-axis direction. Since the second support mechanism 21 has substantially the same configuration as the first support mechanism 17, detailed description thereof will be omitted.

The conveying device 22 conveys the workpiece 5 toward the positive side of the Y axis. For example, as shown in FIG. 1, the conveying device 22 includes a conveying roller group 22a, a first cylinder 22b, a second cylinder 22c, a third cylinder 22d, and a fourth cylinder 22e.

The conveying roller group 22a is composed of rollers 22f arranged in the Y-axis direction. The rollers 22f are rotatable about a rotation axis extending in the X-axis direction. As shown in FIG. 1, for example, the rollers 22f are preferably arranged from the region on the negative side of the Y-axis with respect to the preliminary chamber 11 to the region on the positive side of the Y-axis with respect to the cooling chamber 18 except for the regions where the first heating plate 14a of the heating device 14 and the first cooling plate 19a of the cooling device 19 are disposed.

The length in the X-axis direction of the rollers 22f is preferably substantially the same as the distance in the X-axis direction between the surface on the positive side of the X-axis of the groove 16c in the first holding unit 16a of the first holding mechanism 16 and the surface on the negative side of the X-axis of the groove 16e in the second holding unit 16b of the first holding mechanism 16 and the distance in the X-axis direction between the surface on the positive side of the X-axis of the groove in the first holding unit of the second holding mechanism 20 and the surface on the negative side of the X-axis of the groove in the second holding unit of the second holding mechanism 20.

The edge on the positive side of the Z-axis of each roller 22f is preferably located at substantially the same height as the surface on the negative side of the Z-axis of the groove 16c in the first holding unit 16a of the first holding mechanism 16 and the surface on the negative side of the Z-axis of the groove 16e in the second holding unit 16b of the first holding mechanism 16 in the normal state of the first support mechanism 17. The edge on the positive side of the Z-axis of each roller 22f is also preferably located at the same height as the surface on the negative side of the Z-axis of the groove in the first holding unit of the second holding mechanism 20 and the surface on the negative side of the Z-axis of the groove in the second holding unit of the second holding mechanism 20 in the normal state of the second support mechanism 21.

For example, as shown in FIG. 5, the rollers 22f, sidewalls 22g, and legs 22h that are disposed in the region on the negative side of the Y-axis with respect to the preliminary chamber 11 preferably form a conveying stage 22i. The sidewalls 22g rotatably sandwich and support the rollers 22f in the X-axis direction.

For example, as shown in FIG. 5, each sidewall 22*g* is a substantially rectangular plate as viewed in the X-axis direction, and the surface of each sidewall 22*g* that faces the rollers 22*f* is substantially parallel to a YZ plane. The end on the positive side of the Z-axis of each sidewall 22*g* is preferably located on the positive side of the Z-axis with respect to the edges on the positive side of the Z-axis of the rollers 22*f*. The legs 22*h* support the rollers 22*f* and the sidewalls 22*g*. The legs 22*h* are disposed at the four corners of the conveying stage 22*i* as viewed in the Z-axis direction.

For example, as shown in FIG. 5, guide units 22*j* are preferably disposed inside the preliminary chamber 11. The guide units 22*j* are disposed on both sides of the rollers 22*f* as viewed in the Y-axis direction. For example, each guide unit 22*j* is a substantially rectangular plate as viewed in the X-axis direction, and the surface of each guide unit 22*j* that faces the rollers 22*f* is substantially parallel to a YZ plane.

The end on the positive side of the Z-axis of each guide unit 22*j* is preferably located on the positive side of the Z-axis with respect to the surface on the negative side of the Z-axis of the groove 16*c* in the first holding unit 16*a* of the first holding mechanism 16 and the surface on the negative side of the Z-axis of the groove 16*e* in the second holding unit 16*b* of the first holding mechanism 16 in the normal state of the first support mechanism 17. The end on the positive side of the Z-axis of each guide unit 22*j* is also preferably located on the positive side of the Z-axis with respect to the surface on the negative side of the Z-axis of the groove in the first holding unit of the second holding mechanism 20 and the surface on the negative side of the Z-axis of the groove in the second holding unit of the second holding mechanism 20 in the normal state of the second support mechanism 21.

The surface on the negative side of the X-axis of the sidewall 22*g* on the positive side of the X-axis of the conveying stage 22*i*, the surfaces on the negative side of the X-axis of the legs 22*h* on the positive side of the X-axis of the conveying stage 22*i*, the surface on the negative side of the X-axis of the guide unit 22*j* on the positive side of the X-axis, the surface on the positive side of the X-axis of the groove 16*c* in the first holding unit 16*a* of the first holding mechanism 16 in the normal state of the first support mechanism 17, and the surface on the positive side of the X-axis of the groove in the first holding unit of the second holding mechanism 20 in the normal state of the second support mechanism 21 are preferably substantially flush with each other.

The surface on the positive side of the X-axis of the sidewall 22*g* on the negative side of the X-axis of the conveying stage 22*i*, the surfaces on the positive side of the X-axis of the legs 22*h* on the negative side of the X-axis of the conveying stage 22*i*, the surface on the positive side of the X-axis of the guide unit 22*j* on the negative side of the X-axis, the surface on the negative side of the X-axis of the groove 16*e* in the second holding unit 16*b* of the first holding mechanism 16 in the normal state of the first support mechanism 17, and the surface on the negative side of the X-axis of the groove in the second holding unit of the second holding mechanism 20 in the normal state of the second support mechanism 21 are preferably substantially flush with each other.

For example, as shown in FIGS. 1 and 5, the first cylinder 22*b* is disposed in the region on the negative side of the Y-axis with respect to the conveying stage 22*i*. A rod of the first cylinder 22*b* is extended toward the positive side of the Y-axis to push and load the workpiece 5 placed on the rollers 22*f* of the conveying stage 22*i* into the preliminary chamber 11.

For example, as shown in FIG. 1, the second cylinder 22*c* is disposed on the negative side of the Z-axis with respect to the conveying stage 22*i*. A rod of the second cylinder 22*c* is extended toward the positive side of the Y-axis to push and load the workpiece 5 placed in the preliminary chamber 11 into the heating chamber 13.

For example, as shown in FIG. 1, the third cylinder 22*d* is disposed on the negative side of the Z-axis with respect to the preliminary chamber 11. A rod of the third cylinder 22*d* is extended toward the positive side of the Y-axis to push and load the workpiece 5 placed in the heating chamber 13 into the cooling chamber 18.

For example, as shown in FIG. 1, the fourth cylinder 22*e* is disposed on the negative side of the Z-axis with respect to the heating chamber 13. A rod of the fourth cylinder 22*e* is extended toward the positive side of the Y-axis to push and unload the workpiece 5 placed in the cooling chamber 18 out of the brazing apparatus 1. The conveying device 22 is not limited to the above configuration, and may have any configuration as long as it can convey the workpiece 5 toward the positive side of the Y axis.

As shown in FIG. 2, the control device 23 controls the following components: the first opening and closing unit 11*a* and the second opening and closing unit 11*b* of the preliminary chamber 11, the exhaust unit 12*a* and the nitrogen supply unit 12*b* of the first deoxidizing device 12, the second opening and closing unit 13*b* of the heating chamber 13, and the heater 14*e* of the first heating plate 14*a*, the heater 14*g* of the second heating plate 14*b*, and the lifting unit 14*c* of the heating device 14.

As shown in FIG. 2, the control device 23 further controls the following components: the exhaust unit 15*a* and the nitrogen supply unit 15*b* of the second deoxidizing device 15, the second opening and closing unit 18*b* of the cooling chamber 18, the cooler 19*e* of the first cooling plate 19*a*, the cooler 19*g* of the second cooling plate 19*b*, and the lifting unit 19*c* of the cooling device 19, and the first cylinder 22*b*, the second cylinder 22*c*, the third cylinder 22*d*, and the fourth cylinder 22*e* of the conveying device 22.

Next, a brazing method for brazing metal plates (hereinafter, sometimes simply referred to as brazing method) according to the present embodiment will be described. It is herein assumed that the first opening and closing unit 11*a* and the second opening and closing unit 11*b* of the preliminary chamber 11, the second opening and closing unit 13*b* of the heating chamber 13, and the second opening and closing unit 18*b* of the cooling chamber 18 are closed in the initial state.

It is also assumed that the first heating plate 14*a* and the second heating plate 14*b* have been heated to a preset temperature and the first cooling plate 19*a* and the second cooling plate 19*b* have been cooled to a preset temperature.

First, the workpiece 5 is formed by stacking the first metal plate 2 and the second metal plate 3 in the Z-axis direction while placing the brazing material 4 between the surface on the positive side of the Z-axis of the first metal plate 2 and the surface on the negative side of the Z-axis of the second metal plate 3. The workpiece 5 is then placed on the rollers 22*f* of the conveying stage 22*i*.

Figure 7:
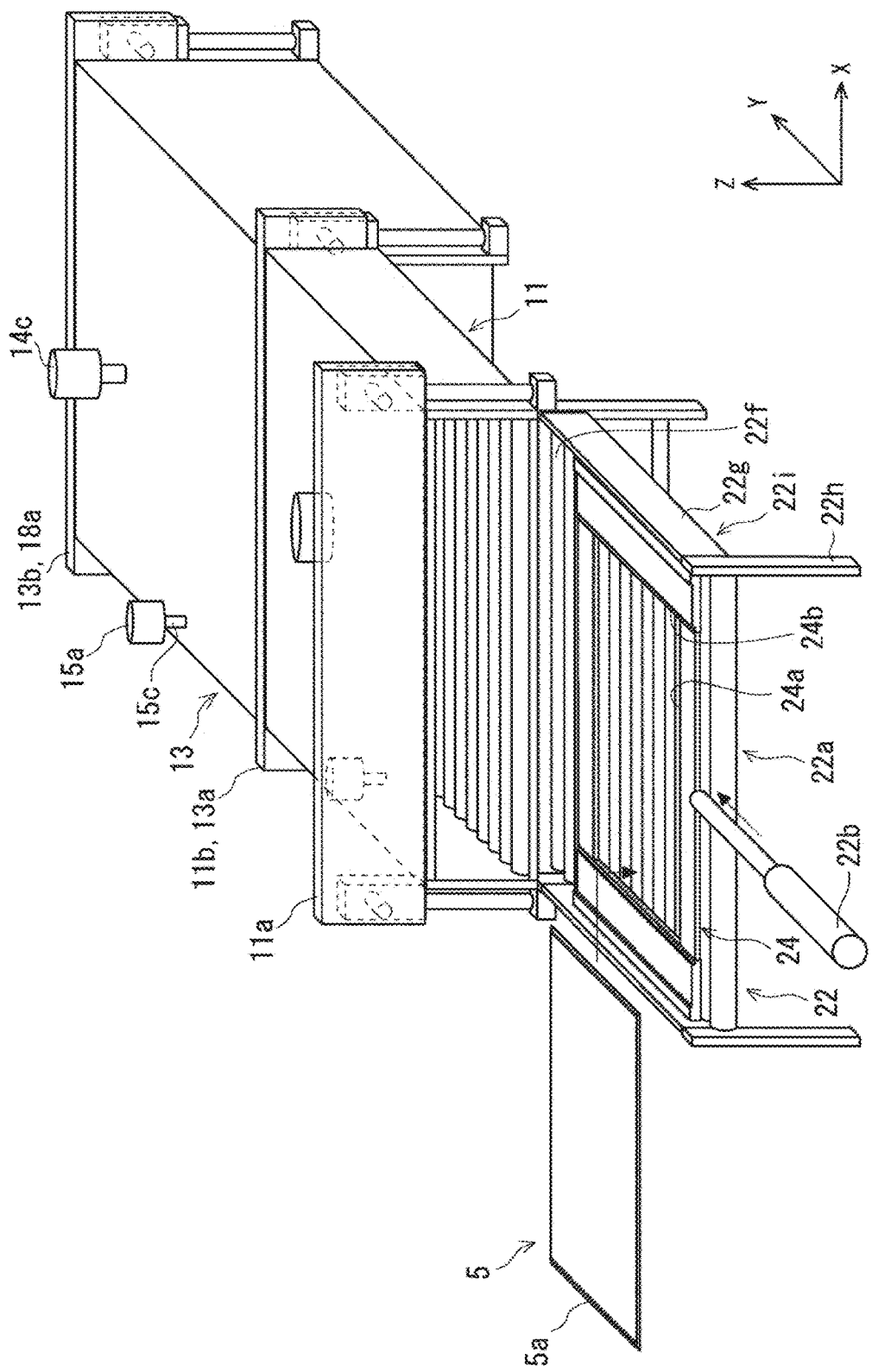
FIG. 7 illustrates the flow of loading the workpiece into the preliminary chamber of the brazing apparatus of the first embodiment.
Figure 8:
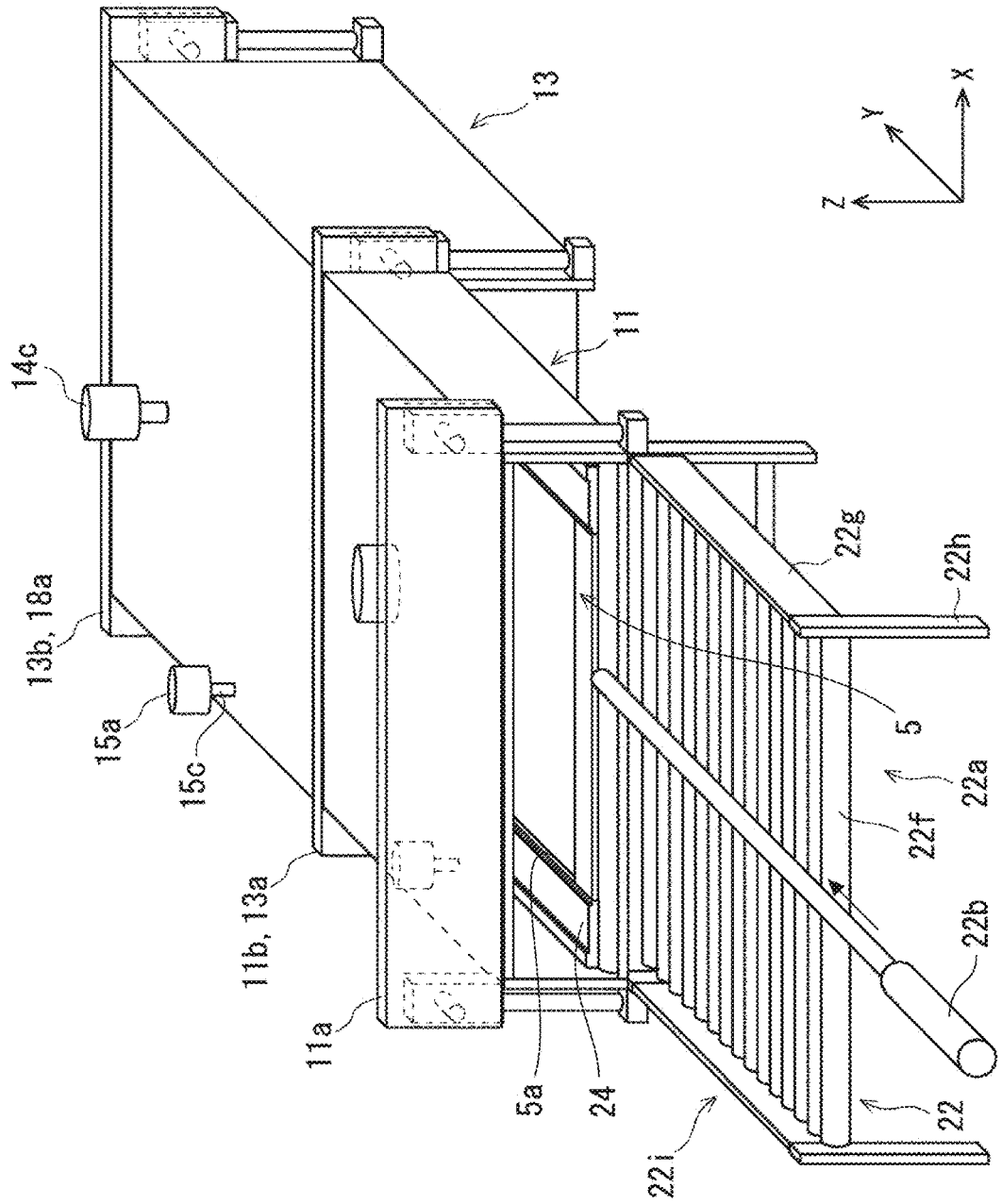
FIG. 8 illustrates the flow of loading the workpiece into the preliminary chamber of the brazing apparatus of the first embodiment.
Figure 9:
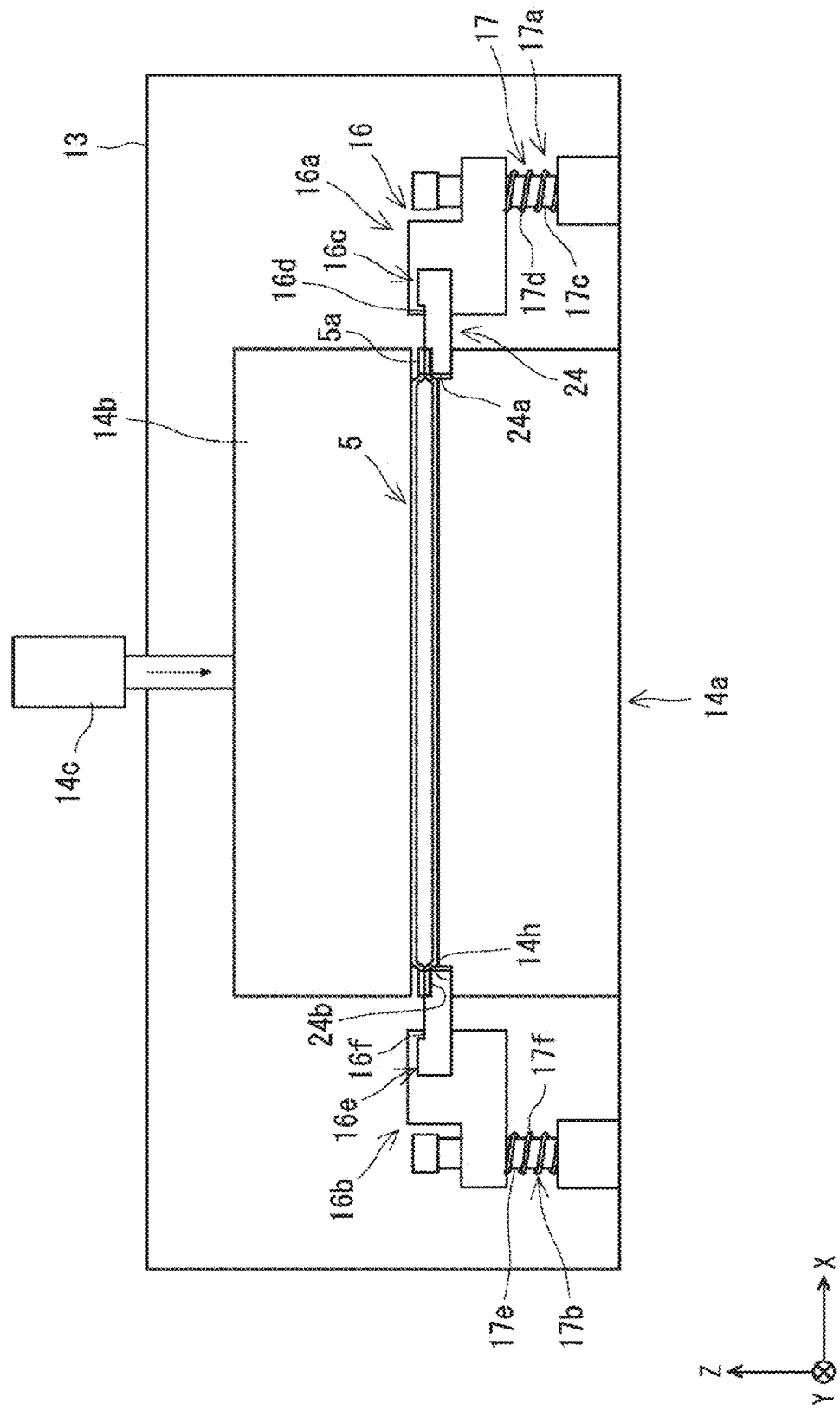
FIG. 9 shows how the workpiece is heated inside the heating chamber of the brazing apparatus of the first embodiment as viewed from the negative side of the Y-axis.

FIGS. 7 and 8 illustrate the flow of loading the workpiece into the preliminary chamber of the brazing apparatus of the present embodiment. FIG. 9 shows how the workpiece is heated inside the heating chamber of the brazing apparatus 1 of the present embodiment as viewed from the negative side of the Y-axis. The cooling chamber etc. are not shown in FIGS. 7 and 8.

In the present embodiment, as shown in FIG. 7 etc., the workpiece 5 is placed on a jig 24 and conveyed. The jig 24 is in the shape of a frame as viewed in the Z-axis direction, and can be made of, e.g., graphite. That is, the jig 24 is a substantially rectangular plate having a substantially rectangular opening 24a substantially in its center as viewed in the Z-axis direction.

The opening 24a is large enough to expose the surface on the negative side of the Z-axis of the workpiece 5. The surface on the positive side of the Z-axis of the jig 24 has a placing portion 24b along the peripheral edge portion of the opening 24a. The placing portion 24b is a portion on which the peripheral edge portion (i.e., flange portion 5a) of the workpiece 5 is to be placed.

The length in the X-axis direction of the jig 24 is preferably substantially the same as the distance in the X-axis direction between the surface on the positive side of the X-axis of the groove 16c in the first holding unit 16a of the first holding mechanism 16 and the surface on the negative side of the X-axis of the groove 16e in the second holding unit 16b of the first holding mechanism 16 and the distance in the X-axis direction between the surface on the positive side of the X-axis of the groove in the first holding unit of the second holding mechanism 20 and the surface on the negative side of the X-axis of the groove in the second holding unit of the second holding mechanism 20.

The end portion on the positive side of the X-axis of the jig 24 preferably has substantially the same shape as the groove 16c in the first holding unit 16a of the first holding mechanism 16 and the groove in the first holding unit of the second holding mechanism 20. The end portion on the negative side of the X-axis of the jig 24 preferably has substantially the same shape as the groove 16e in the second holding unit 16b of the first holding mechanism 16 and the groove in the second holding unit of the second holding mechanism 20.

When the workpiece 5 is placed on the rollers 22f of the conveying stage 22i via such a jig 24, the jig 24 is first placed on the rollers 22f of the conveying stage 22i, and the flange portion 5a of the workpiece 5 is then placed on the placing portion 24b of the jig 24 in such a manner that the surface on the negative side of the Z-axis of the workpiece 5 is exposed through the opening 24a of the jig 24.

At this time, the surface on the positive side of the X-axis of the jig 24 is preferably substantially in surface contact with the surface on the negative side of the X-axis of the sidewall 22g on the positive side of the X-axis of the conveying stage 22i, and the surface on the negative side of the X-axis of the jig 24 is preferably substantially in surface contact with the positive side of the X-axis of the sidewall 22g on the negative side of the X-axis of the conveying stage 22i.

Next, the control device 23 controls the first opening and closing unit 11a of the preliminary chamber 11 to open the first opening and closing unit 11a. The control device 23 then controls the first cylinder 22b to extend the rod of the first cylinder 22b toward the positive side of the Y-axis so that the rod of the first cylinder 22b moves the jig 24 toward the positive side of the Y-axis along the conveying roller group 22a to load the jig 24 into the preliminary chamber 11 as shown in FIG. 8.

At this time, the surface on the negative side of the X-axis of the sidewall 22g on the positive side of the X-axis of the conveying stage 22i and the surface on the positive side of the X-axis of the sidewall 22g on the negative side of the X-axis of the conveying stage 22i function as guide surfaces that guide the jig 24 between the guide unit 22j on the positive side of the X-axis and the guide unit 22j on the negative side of the X-axis inside the preliminary chamber 11.

Thereafter, the control device 23 controls the first opening and closing unit 11a of the preliminary chamber 11 to close the first opening and closing unit 11a. The control device 23 then controls the exhaust unit 12a and the nitrogen supply unit 12b of the first deoxidizing device 12 and the exhaust unit 15a and the nitrogen supply unit 15b of the second deoxidizing device 15 to control the oxygen concentration in the preliminary chamber 11 and the oxygen concentration in the heating chamber 13 to a preset oxygen concentration (e.g., 50 ppm) or less.

At this time, the control device 23 preferably controls the exhaust unit 12a and the nitrogen supply unit 12b of the first deoxidizing device 12 and the exhaust unit 15a and the nitrogen supply unit 15b of the second deoxidizing device 15 based on the detection results from oxygen sensors etc. mounted in the preliminary chamber 11 and the heating chamber 13.

Subsequently, the control device 23 controls the second opening and closing unit 11b of the preliminary chamber 11 (namely, the first opening and closing unit 13a of the heating chamber 13) to open the second opening and closing unit 11b. The control device 23 then controls the second cylinder 22c to extend the rod of the second cylinder 22c toward the positive side of the Y-axis so that the rod of the second cylinder 22c moves the jig 24 toward the positive side of the Y-axis along the conveying roller group 22a to load the jig 24 into the heating chamber 13 as shown in FIG. 1.

As described above, after the oxygen concentration in the preliminary chamber 11 and the oxygen concentration in the heating chamber 13 become equal to or less than the preset oxygen concentration, the second opening and closing unit 11b of the preliminary chamber 11 is opened to load the workpiece 5 into the heating chamber 13. This can reduce an increase in oxygen concentration in the heating chamber 13.

At this time, the edges on the positive side of the Z-axis of the rollers 22f are located at substantially the same height in the Z-axis direction as the surface on the negative side of the Z-axis of the groove 16c in the first holding unit 16a of the first holding mechanism 16 and the surface on the negative side of the Z-axis of the groove 16e in the second holding unit 16b of the first holding mechanism 16 in the normal state of the first support mechanism 17.

The ends on the positive side of the Z-axis of the guide units 22j disposed inside the preliminary chamber 11 are located on the positive side of the Z-axis with respect to the surface on the negative side of the Z-axis of the groove 16c in the first holding unit 16a of the first holding mechanism 16 and the surface on the negative side of the Z-axis of the groove 16e in the second holding unit 16b of the first holding mechanism 16 in the normal state of the first support mechanism 17.

The surface on the negative side of the X-axis of the guide unit 22j on the positive side of the X-axis is substantially flush with the surface on the positive side of the X-axis of the groove 16c in the first holding unit 16a of the first holding mechanism 16 in the normal state of the first support mechanism 17. Therefore, the surface on the negative side of the X-axis of the guide unit 22j on the positive side of the X-axis functions as a guide surface that guides the end portion on the positive side of the X-axis of the jig 24 into the groove 16c.

The surface on the positive side of the X-axis of the guide unit 22*j* on the negative side of the X-axis is substantially flush with the surface on the negative side of the X-axis of the groove 16*e* in the second holding unit 16*b* of the first holding mechanism 16 in the normal state of the first support mechanism 17. Therefore, the surface on the positive side of the X-axis of the guide unit 22*j* on the negative side of the X-axis functions as a guide surface that guides the end portion on the negative side of the X-axis of the jig 24 into the groove 16*e*.

Accordingly, as shown in FIG. 6, the end portion on the positive side of the X axis of the jig 24 is inserted into the groove 16*c* in the first holding unit 16*a* of the first holding mechanism 16, and the end portion on the negative side of the X axis of the jig 24 is inserted into the groove 16*e* in the second holding unit 16*b* of the first holding mechanism 16, so that the workpiece 5 is placed between the first heating plate 14*a* and the second heating plate 14*b* without contacting the first heating plate 14*a* and the second heating plate 14*b*.

Since the workpiece 5 does not contact the first heating plate 14*a* and the second heating plate 14*b* when loaded into the heating chamber 13, the workpiece 5 is less likely to have a temperature distribution in the Z-axis direction. As a result, warping and distortion of the workpiece 5 can be reduced. At this time, the entire workpiece 5 is located inside the region where the first heating plate 14*a* and the second heating plate 14*b* are disposed, as viewed in the Z-axis direction.

Subsequently, the control device 23 controls the first opening and closing unit 13*a* of the heating chamber 13 to close the first opening and closing unit 13*a*. The control device 23 then controls the lifting unit 14*c* of the heating device 14 to move the second heating plate 14*b* toward the negative side of the Z-axis to bring the second heating plate 14*b* into contact with the workpiece 5 and push the workpiece 5 toward the negative side of the Z-axis. At this time, the surface on the positive side of the Z-axis of the workpiece 5 and the surface on the negative side of the Z-axis of the second heating plate 14*b* are preferably substantially in surface contact with each other.

As a result, the first holding unit 16*a* of the first holding mechanism 16 is moved toward the negative side of the Z-axis along the guide pins 17*c* of the first support unit 17*a* of the first support mechanism 17, and the second holding unit 16*b* of the first holding mechanism 16 is moved toward the negative side of the Z-axis along the guide pins 17*e* of the second support unit 17*b* of the first support mechanism 17, while contracting the elastic bodies 17*d*, 17*f* of the first support mechanism 17 toward the negative side of the Z-axis. Accordingly, the workpiece 5 together with the jig 24 is moved toward the negative side of the Z-axis.

The second heating plate 14*b* is further moved toward the negative side of the Z-axis to bring the workpiece 5 into contact with the first heating plate 14*a* as shown in FIG. 9. At this time, the surface on the negative side of the Z-axis of the workpiece 5 and the surface on the positive side of the Z-axis of the first heating plate 14*a* are preferably substantially in surface contact with each other.

The workpiece 5 is thus sandwiched and heated between the first heating plate 14*a* and the second heating plate 14*b*. As a result, the brazing material 4 is melted to braze the portion of the first metal plate 2 that is to be brazed and the portion of the second metal plate 3 that is to be brazed.

As described above, the control device 23 preferably continuously or intermittently controls the exhaust unit 15*a* and the nitrogen supply unit 15*b* of the second deoxidizing device 15 so that the oxygen concentration in the heating chamber 13 is kept at the preset oxygen concentration or less during brazing of the workpiece 5. As shown in FIG. 9, the first heating plate 14*a* preferably has relief portions 14*h* for preventing interference with the first holding unit 16*a* and the second holding unit 16*b* of the first holding mechanism 16.

As described above, substantially the entire workpiece 5 is sandwiched and heated between the first heating plate 14*a* and the second heating plate 14*b*. Therefore, substantially the entire workpiece 5 can be rapidly heated as compared to a common brazing method in which metal plates are brazed together by heating a workpiece in a furnace and a method in which a pair of heat rollers and aluminum materials are relatively moved to move the heat rollers over the entire portions to be brazed like the method disclosed in JP H06-91367 A. The first metal plate 2 and the second metal plate 3 can therefore be reliably and quickly brazed together.

Moreover, the first metal plate 2 and the second metal plate 3 are less likely to be exposed to high temperatures for a long time, so that a decrease in material strength and hardness due to dulling of the first and second metal plates 2, 3 can be reduced.

The first metal plate 2 and the second metal plate 3 are brazed together inside the heating chamber 13 having the preset oxygen concentration or less. Therefore, the first metal plate 2 and the second metal plate 3 can be satisfactorily brazed together without hindering the flux of the brazing material 4 from removing oxide films on the first metal plate 2 and the second metal plate 3.

In addition, when the plate bodies (top plates) of the first and second heating plates 14*a*, 14*b* are single-piece formed graphite plates, the first and second heating plates 14*a*, 14*b* are lightweight compared to the case where the plate bodies have a three-layer structure composed of a mild steel material, a copper plate, and a stainless steel plate. Moreover, since a heat resistance layer is not formed, the heat-up time is short, and therefore a variation in surface temperature can be reduced as compared to the plate bodies having the three-layer structure. Moreover, the single-piece formed graphite plate can reduce distortion of the contact surface with the workpiece 5 as compared to the three-layer structure composed of a mild steel material, a copper plate, and a stainless steel plate.

Subsequently, the control device 23 controls the lifting unit 14*c* of the heating device 14 to move the second heating plate 14*b* toward the positive side of the Z-axis to release the workpiece 5 from the first heating plate 14*a* and the second heating plate 14*b*.

As a result, due to the restoring forces of the elastic bodies 17*d*, 17*f* of the first support mechanism 17, the first holding unit 16*a* of the first holding mechanism 16 is moved toward the positive side of the Z-axis along the guide pins 17*c* of the first support unit 17*a* of the first support mechanism 17, and the second holding unit 16*b* of the first holding mechanism 16 is moved toward the positive side of the Z-axis along the guide pins 17*e* of the second support unit 17*b* of the first support mechanism 17. Accordingly, the workpiece 5 together with the jig 24 is moved toward the positive side of the Z-axis, and the first support mechanism 17 returns to the height position in the Z-axis direction in the normal state.

Thereafter, the control device 23 controls the second opening and closing unit 13*b* of the heating chamber 13 (namely, the first opening and closing unit 18*a* of the cooling chamber 18) to open the second opening and closing unit 13*b*. The control device 23 then controls the third cylinder 22*d* to extend the rod of the third cylinder 22*d* toward the positive side of the Y-axis so that the rod of the third cylinder 22d moves the jig 24 toward the positive side of the Y-axis along the conveying roller group 22a to load the jig 24 into the cooling chamber 18.

At this time, the groove 16c in the first holding unit 16a of the first holding mechanism 16 in the normal state of the first support mechanism 17 and the groove in the first holding unit of the second holding mechanism 20 in the normal state of the second support mechanism 21 are located so as to be substantially continuous as viewed in the Y-axis direction.

The groove 16e in the second holding unit 16b of the first holding mechanism 16 in the normal state of the first support mechanism 17 and the groove in the second holding unit of the second holding mechanism 20 in the normal state of the second support mechanism 21 are also located so as to be substantially continuous as viewed in the Y-axis direction.

Therefore, the end portion on the positive side of the X axis of the jig 24 is guided and inserted into the groove in the first holding unit of the second holding mechanism 20, and the end portion on the negative side of the X axis of the jig 24 is guided and inserted into the groove in the second holding unit of the second holding mechanism 20, so that the workpiece 5 is placed between the first cooling plate 19a and the second cooling plate 19b without contacting the first cooling plate 19a and the second cooling plate 19b.

Since the workpiece 5 does not contact the first cooling plate 19a and the second cooling plate 19b when loaded into the cooling chamber 18, the workpiece 5 is less likely to have a temperature distribution in the Z-axis direction. As a result, warping and distortion of the workpiece 5 can be reduced. At this time, the entire workpiece 5 is located inside the region where the first cooling plate 19a and the second cooling plate 19b are disposed, as viewed in the Z-axis direction.

Subsequently, the control device 23 controls the first opening and closing unit 18a of the cooling chamber 18 to close the first opening and closing unit 18a. The control device 23 then controls the lifting unit 19c of the cooling device 19 to move the second cooling plate 19b toward the negative side of the Z-axis to bring the second cooling plate 19b into contact with the workpiece 5 and push the workpiece 5 toward the negative side of the Z-axis. At this time, the surface on the positive side of the Z-axis of the workpiece 5 and the surface on the negative side of the Z-axis of the second cooling plate 19b are preferably substantially in surface contact with each other.

As a result, the first holding unit of the second holding mechanism 20 is moved toward the negative side of the Z-axis while being supported by the first support unit of the second support mechanism 21, and the second holding unit of the second holding mechanism 20 is moved toward the negative side of the Z-axis while being supported by the second support unit of the second support mechanism 21. Accordingly, the workpiece 5 together with the jig 24 is moved toward the negative side of the Z-axis.

The second cooling plate 19b is further moved toward the negative side of the Z-axis to bring the workpiece 5 into contact with the first cooling plate 19a. At this time, the surface on the negative side of the Z-axis of the workpiece 5 and the surface on the positive side of the Z-axis of the first cooling plate 19a are preferably substantially in surface contact with each other.

The workpiece 5 is thus sandwiched and cooled between the first cooling plate 19a and the second cooling plate 19b. As described above, in the present embodiment, the cooling device 19 can be used to rapidly cool the workpiece 5 for so-called tempering. Therefore, the toughness of the workpiece 5 can be restored and the structure of the workpiece 5 can be stabilized as compared to the case where the workpiece 5 is naturally cooled.

Lastly, the control device 23 controls the second opening and closing unit 18a of the heating chamber 13 to close the second opening and closing unit 18a. The control device 23 then controls the fourth cylinder 22e to extend the rod of the fourth cylinder 22e toward the positive side of the Y-axis so that the rod of the fourth cylinder 22e moves the jig 24 toward the positive side of the Y-axis along the conveying roller group 22a to unload the jig 24 out of the brazing apparatus 1.

As described above, in the brazing apparatus 1 and the brazing method of the present embodiment, substantially the entire workpiece 5 is sandwiched and heated between the first heating plate 14a and the second heating plate 14b. Therefore, according to the brazing apparatus 1 and brazing method of the present embodiment, substantially the entire workpiece 5 can be reliably and rapidly heated as compared to a common brazing method in which metal plates are brazed together by heating a workpiece in a furnace and a method in which a pair of heat rollers and aluminum materials are relatively moved to move the heat rollers over the entire portions to be brazed like the method disclosed in JP H06-91367 A. According to the brazing apparatus 1 and the brazing method of the present embodiment, a highly feasible brazing apparatus and brazing method can therefore be implemented.

In particular, in the brazing apparatus 1 and the brazing method of the present embodiment, the first metal plate 2 and the second metal plate 3 can be reliably and rapidly brazed together even when, for example, the first metal plate 2 and the second metal plate 3 have a large planar area as viewed in the Z-axis direction and the portion to be brazed is located over a wide area of the first and second metal plates 2, 3.

A new workpiece 5 may be loaded into the preliminary chamber 11 and the oxygen concentration in the preliminary chamber 11 may be controlled to the preset oxygen concentration or less while the workpiece 5 is being heated in the heating chamber 13. This can improve the productivity of the brazing work of the workpieces 5. The workpiece 5 may be heated in the heating chamber 13 while another workpiece 5 is being cooled in the cooling chamber 18. This can also improve the productivity of the brazing work of the workpieces 5.

In the present embodiment, the first holding unit 16a and the second holding unit 16b of the first holding mechanism 16 are supported so as to be movable up and down in the Z-axis direction. However, the first holding unit 16a and the second holding unit 16b of the first holding mechanism 16 may be supported so as not to be movable up and down in the Z-axis direction.

In other words, the brazing apparatus 1 may have any configuration as long as the workpiece 5 can be held by the first holding mechanism 16 and placed between the first heating plate 14a and the second heating plate 14b without contacting the first heating plate 14a and the second heating plate 14b when the workpiece 5 is loaded into the heating chamber 13. In this case, both the first heating plate 14a and the second heating plate 14b are preferably configured to be movable up and down in the Z-axis direction.

Similarly, in the present embodiment, the first holding unit and the second holding unit of the second holding mechanism 20 are supported so as to be movable up and down in the Z-axis direction. However, the first holding unit and the second holding unit of the second holding mechanism 20 may be supported so as not to be movable up and down in the Z-axis direction.

In other words, the brazing apparatus 1 may have any configuration as long as the workpiece 5 can be held by the second holding mechanism 20 and placed between the first cooling plate 19a and the second cooling plate 19b without contacting the first cooling plate 19a and the second cooling plate 19b when the workpiece 5 is loaded into the cooling chamber 18. In this case, both the first cooling plate 19a and the second cooling plate 19b are preferably configured to be movable up and down in the Z-axis direction.

In the present embodiment, the workpiece 5 is placed on the jig 24. However, the jig 24 may be omitted. In this case, the end portion on the positive side of the X-axis of the workpiece 5 may be directly inserted into the groove 16c in the first holding unit 16a of the first holding mechanism 16 and the end portion on the negative side of the X-axis of the workpiece 5 may be directly inserted into the groove 16e in the second holding unit 16b of the first holding mechanism 16, and the end portion on the positive side of the X-axis of the workpiece 5 may be directly inserted into the groove in the first holding unit of the second holding mechanism 20 and the end portion on the negative side of the X-axis of the workpiece 5 may be directly inserted into the groove in the second holding unit of the second holding mechanism 20.

Second Embodiment

Figure 10:
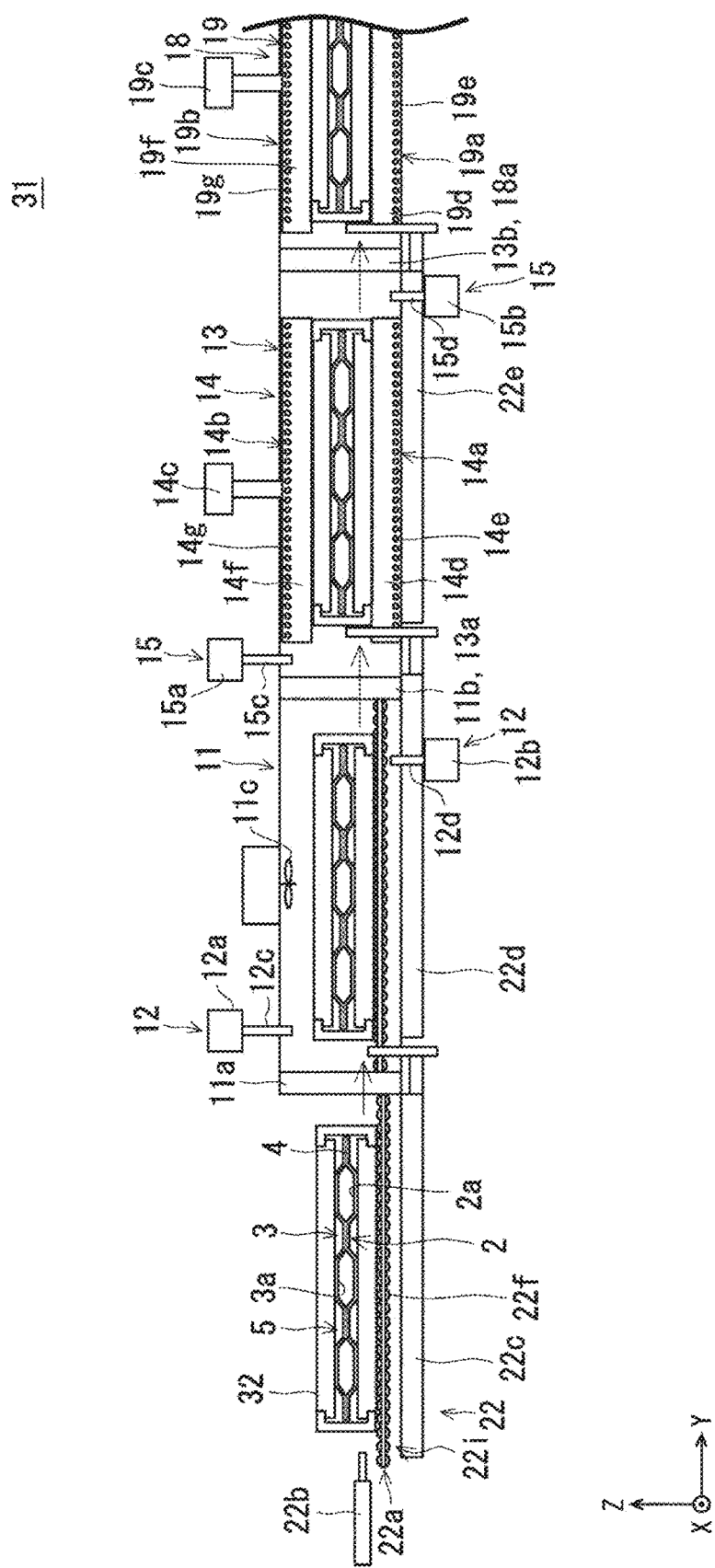
FIG. 10 illustrates the flow of brazing metal plates together using a brazing apparatus for brazing metal plates together according to a second embodiment.

FIG. 10 illustrates the flow of brazing metal plates together using a brazing apparatus of a second embodiment. As shown in FIG. 10, a brazing apparatus 31 of the present embodiment has substantially the same configuration as the brazing apparatus 1 of the first embodiment. Therefore, description will not be repeated, and the same members as those of the first embodiment are denoted with the same signs as those of the first embodiment.

As shown in FIG. 10, the brazing apparatus 31 of the present embodiment does not include the first holding mechanism 16, the first support mechanism 17, the second holding mechanism 20, the second support mechanism 21, etc. of the brazing apparatus 1 of the first embodiment. The edges on the positive side of the Z-axis of the rollers 22f of the conveying device 22 are preferably located substantially at the same height as the surface on the positive side of the Z-axis of the first heating plate 14a of the heating device 14 and the surface on the positive side of the Z-axis of the first cooling plate 19a of the cooling device 19.

Figure 12:
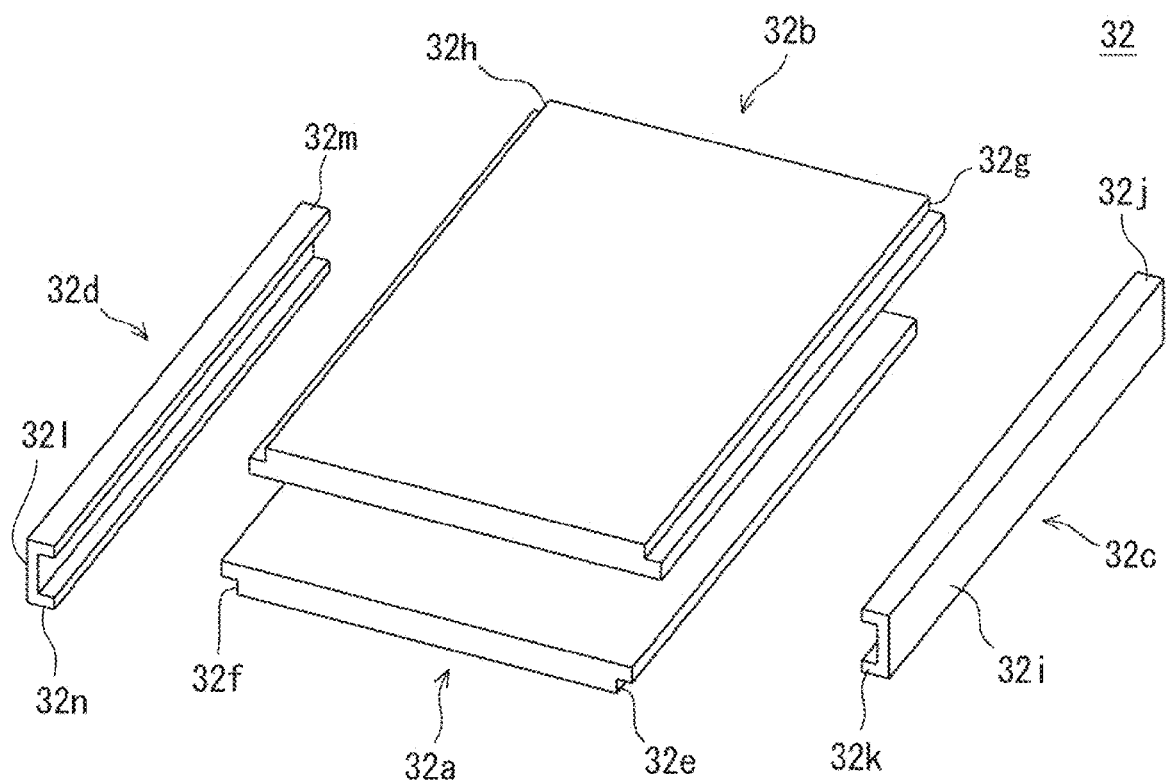
FIG. 12 is a perspective view of the restraining jig in a pre-assembled state.

In the present embodiment, in order to reduce the possibility of the workpiece 5 having a temperature distribution in the Z-axis direction, the workpiece 5 is conveyed while being restrained by a restraining jig 32. FIG. 11 is a YZ sectional view of the workpiece 5 clamped by the restraining jig 32. FIG. 12 is a perspective view of the restraining jig 32 in a pre-assembled state.

First, the configuration of the restraining jig 32 of the present embodiment will be described. As shown in FIGS. 11 and 12, the restraining jig 32 includes, for example, a first restraining plate 32a, a second restraining plate 32b, a first clamp 32c, and a second clamp 32d.

The first restraining plate 32a is large enough to cover the entire workpiece 5 as viewed in the Z-axis direction, and the surface on the positive side of the Z-axis of the first restraining plate 32a and the surface on the negative side of the Z-axis of the first restraining plate 32a are flat surfaces substantially parallel to an XY plane. The first restraining plate 32a has, for example, a substantially rectangular shape as viewed in the Z-axis direction.

As shown in FIGS. 11 and 12, the first restraining plate 32a has a first cut portion 32e in its portion located on the positive side of the Y-axis and the negative side of the Z-axis. The first cut portion 32e is formed along the side on the positive side of the Y-axis of the first restraining plate 32a. The first restraining plate 32a also has a second cut portion 32f in its portion located on the negative side of the Y-axis and the negative side of the Z-axis. The second cut portion 32f is formed along the side on the negative side of the Y-axis of the first restraining plate 32a.

As shown in FIGS. 11 and 12, the second restraining plate 32b is symmetrical with the first restraining plate 32a with respect to the Y-axis as viewed in the X-axis direction. Therefore, although detailed description will be omitted, the surface on the positive side of the Z-axis of the second restraining plate 32b and the surface on the negative side of the Z-axis of the second restraining plate 32b are flat surfaces substantially parallel to an XY plane, and the second restraining plate 32b has a first cut portion 32g and a second cut portion 32h.

In order to keep the workpiece 5 held between the first restraining plate 32a and the second restraining plate 32b, the first clamp 32c clamps the portion on the positive side of the Y-axis of the first restraining plate 32a and the portion on the positive side of the Y-axis of the second restraining plate 32b. As shown in FIGS. 11 and 12, the first clamp 32c is, for example, a C-shaped channel member extending in the X-axis direction.

That is, as shown in FIGS. 11 and 12, the first clamp 32c includes a vertical portion 32i substantially parallel to an XZ plane, a first horizontal portion 32j protruding from the end portion on the positive side of the Z-axis of the vertical portion 32i toward the negative side of the Y-axis, and a second horizontal portion 32k protruding from the end portion on the negative side of the Z-axis of the vertical portion 32i toward the negative side of the Y-axis.

As shown in FIG. 11, the length in the Y-axis direction of the first horizontal portion 32j is preferably substantially the same as the length in the Y-axis direction of the first cut portion 32g of the second restraining plate 32b, and the height in the Z-axis direction of the first horizontal portion 32j is preferably substantially the same as the height in the Z-axis direction of the first cut portion 32g of the second restraining plate 32b.

As shown in FIG. 11, the length in the Y-axis direction of the second horizontal portion 32k is preferably substantially the same as the length in the Y-axis direction of the first cut portion 32e of the first restraining plate 32a, and the height in the Z-axis direction of the second horizontal portion 32k is preferably substantially the same as the height in the Z-axis direction of the first cut portion 32e of the first restraining plate 32a.

As shown in FIG. 11, in order to keep the workpiece 5 held between the first restraining plate 32a and the second restraining plate 32b, the second clamp 32d clamps the portion on the negative side of the Y-axis of the first restraining plate 32a and the portion on the negative side of the Y-axis of the second restraining plate 32b.

As shown in FIGS. 11 and 12, the second clamp 32d is symmetrical with the first clamp 32c with respect to the Z-axis as viewed in the X-axis direction. Therefore, although detailed description will be omitted, the second clamp 32d includes a vertical portion 32l, a first horizontal portion 32m, and a second horizontal portion 32n.

As will be described in detail later, the first restraining plate 32a, the second restraining plate 32b, the first clamp 32c, and the second clamp 32d are heat resistant enough not to be deformed when the restraining jig 32 is held and heated between the first heating plate 14a and the second heating plate 14b.

The first restraining plate 32a, the second restraining plate 32b, the first clamp 32c, and the second clamp 32d preferably have at least such a thermal conductivity and heat capacity that do not hinder heat input from the first heating plate 14a and the second heating plate 14b to the workpiece 5 (e.g., at least a thermal conductivity of iron (80 w/m·K) and at least a heat capacity of aluminum (2.5 J/cm$^3$)), and are preferably made of, for example, isotropic graphite.

Figure 13A:
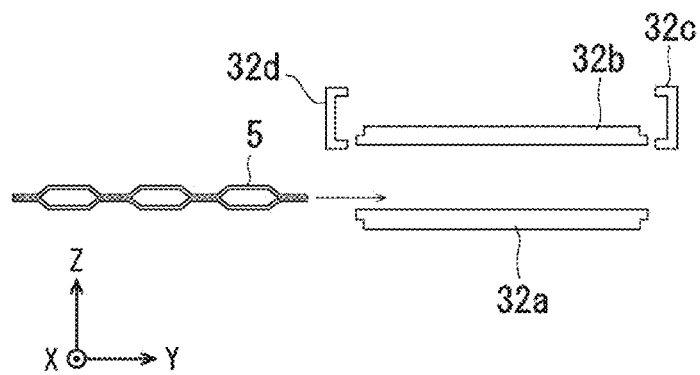
FIGS. 13A to 13D illustrate the flow of restraining the workpiece by the restraining jig.
Figure 13B:
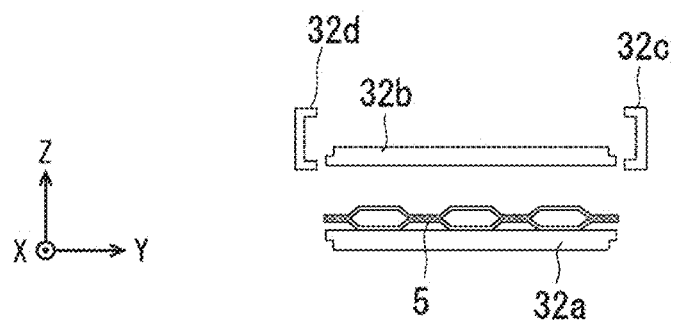

Next, the flow of restraining the workpiece 5 by the restraining jig 32 of the present embodiment will be described. FIGS. 13A to 13D illustrate the flow of restraining the workpiece 5 by the restraining jig 32. First, as shown in FIG. 13A, the workpiece 5 is placed between the first restraining plate 32a and the second restraining plate 32b. Next, as shown in FIG. 13B, the workpiece 5 is placed on the first restraining plate 32a.

Figure 13C:
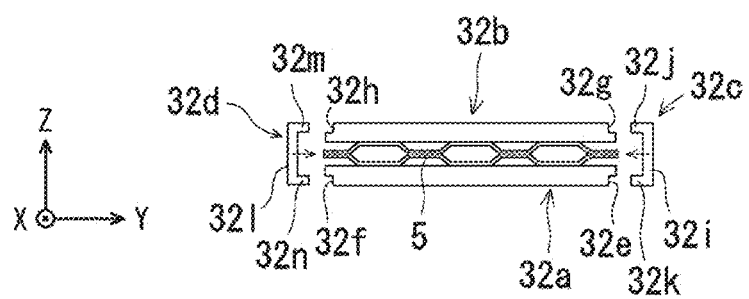

As shown in FIG. 13C, the workpiece 5 is then held between the first restraining plate 32a and the second restraining plate 32b. Thereafter, the first horizontal portion 32j of the first clamp 32c is fitted into the first cut portion 32g of the second restraining plate 32b, and the second horizontal portion 32k of the first clamp 32c is fitted into the first cut portion 32e of the first restraining plate 32a.

The first horizontal portion 32m of the second clamp 32d is fitted into the second cut portion 32h of the second restraining plate 32b, and the second horizontal portion 32n of the second clamp 32d is fitted into the second cut portion 32f of the first restraining plate 32a.

Figure 13D:
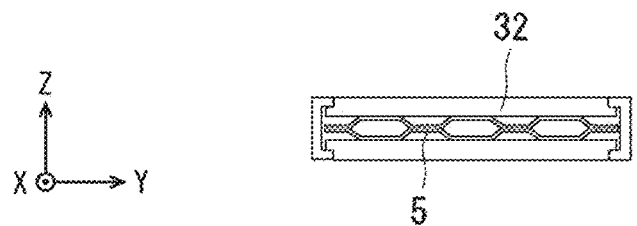

As shown in FIG. 13D, the workpiece 5 can thus be restrained by the restraining jig 32. At this time, the surface on the positive side of the Z-axis of the first restraining plate 32a is substantially in surface contact with the surface on the negative side of the Z-axis of the first metal plate 2, and the surface on the negative side of the Z-axis of the second restraining plate 32b is substantially in surface contact with the surface on the positive side of the Z-axis of the second metal plate 3.

The workpiece 5 thus restrained by the restraining jig 32 is placed on the rollers 22f of the conveying stage 22i. The workpiece 5 is then heated and brazed and also cooled while being conveyed by the conveying device 22 via the restraining jig 32.

The workpiece 5 is restrained by the restraining jig 32. Therefore, the first metal plate 2 and the second metal plate 3 are less likely to warp or distort even when the workpiece 5 has a large temperature distribution in the Z-axis direction when placed on the first heating plate 14a of the heating device 14 or the first cooling plate 19a of the cooling device 19.

Figure 14:
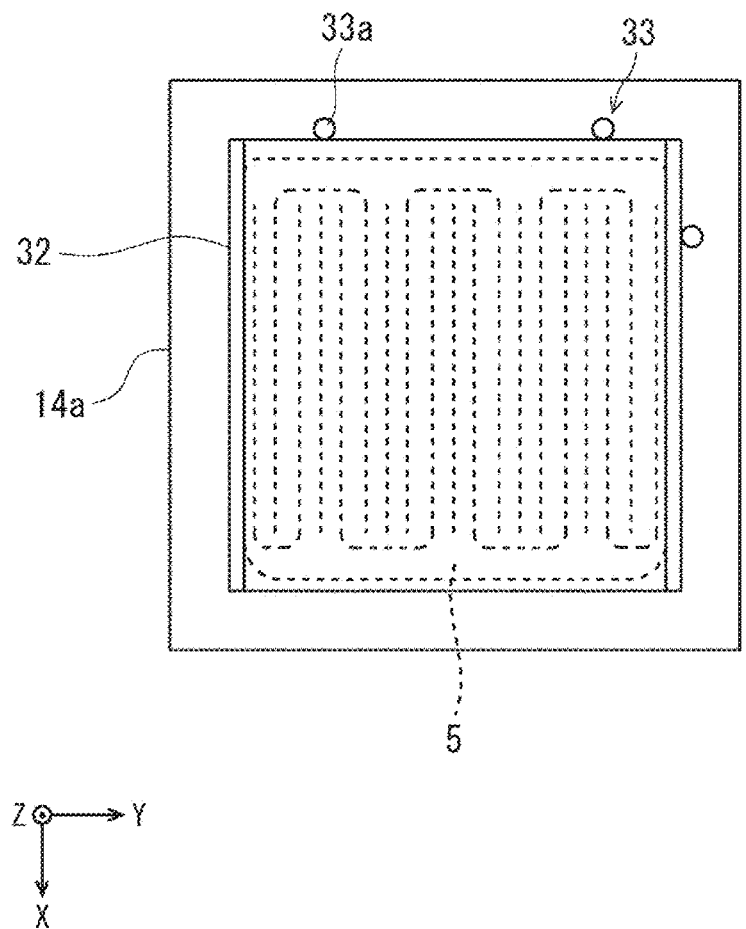
FIG. 14 illustrates arrangement of positioning pins of a positioning unit.

The brazing apparatus 31 preferably includes a positioning unit for positioning the workpiece 5 with respect to the first heating plate 14a when the workpiece 5 restrained by the restraining jig 32 is loaded into the heating chamber 13. FIG. 14 illustrates arrangement of positioning pins of the positioning unit.

As shown in FIG. 14, a positioning unit 33 includes a plurality of positioning pins 33a. The positioning pins 33a are arranged on the first heating plate 14a such that both sides adjacent to the corner on the positive side of the Y-axis of the restraining jig 32 as viewed in the Z-axis direction come into contact with the positioning pins 33a. The positioning pins 33a are moved up and down in the Z-axis direction by a lifting mechanism, not shown.

As shown in FIG. 14, when positioning the workpiece 5 using such a positioning unit 33, the restraining jig 32 restraining the workpiece 5 is loaded into the heating chamber 13 so that the both sides adjacent to the corner of the restraining jig 32 come into contact with the positioning pins 33a. The workpiece 5 can thus be positioned substantially in the middle of the first heating plate 14a via the restraining jig 32 as viewed in the Z-axis direction.

The workpiece 5 can thus be reliably located inside the region where the first heating plate 14a and the second heating plate 14b are disposed, as viewed in the Z-axis direction. When heating of the workpiece 5 is finished and the workpiece 5 is loaded into the cooling chamber 18, the positioning pins 33a are moved toward the negative side of the Z-axis by the lifting mechanism.

The shape of the restraining jig 32 of the present embodiment is illustrative, and the restraining jig 32 may have any shape as long as it can be in surface contact with the workpiece 5. The shape of the restraining jig 32 can be changed as appropriate according to the shape of the workpiece 5. The positioning pins 33a may be in the shape of a block. The positioning pins 33a may have any shape as long as the shape is a columnar shape extending in the Z-axis direction. In the present embodiment, the workpiece 5 is restrained by the restraining jig 32 and conveyed. However, the restraining jig 32 may be omitted.

Example

Figure 15:
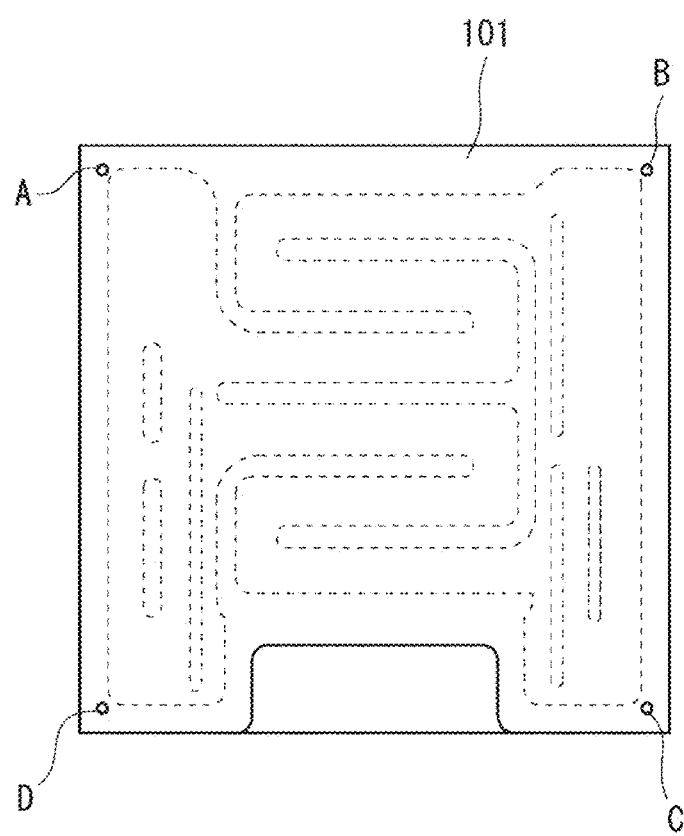
FIG. 15 is a plan view of a test workpiece.

As shown in FIG. 15, a test workpiece 101 was prepared. A first metal plate and a second metal plate were made of A6T02 with a thickness of 6 mm, and a brazing material was A4045. The test workpiece 101 has a rectangular shape with sides of length 300 mm by 300 mm. A portion shown by dashed line in FIG. 15 is a void in the test workpiece 101.

This test workpiece 101 was sandwiched between a first heating plate and a second heating plate in a furnace and heated and brazed. The temperature in the furnace was 620° C., the first heating plate and the second heating plate are steel use stainless (SUS) plates, and a pressure of 79.6 N was applied to the test workpiece 101 by the first heating plate and the second heating plate.

Figure 16:
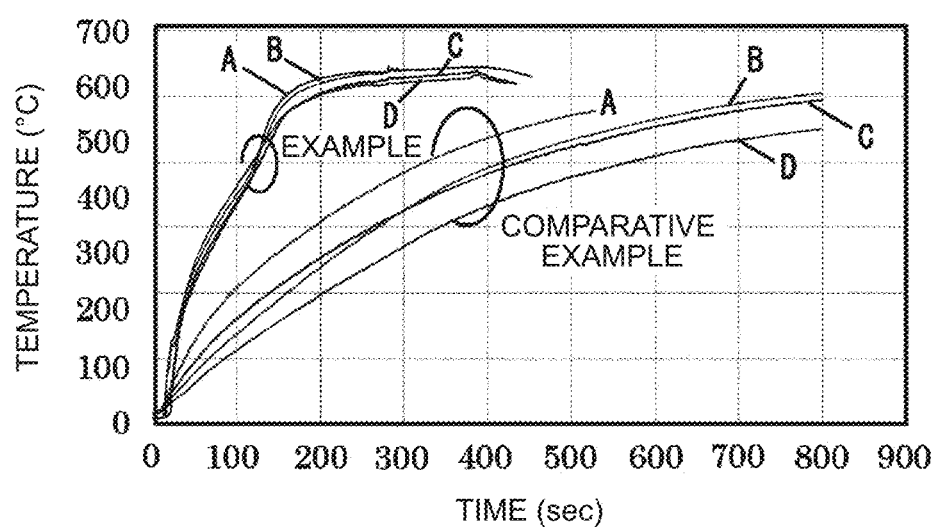
FIG. 16 is a graph showing the relationships between temperature and time at each corner of test workpieces of an example and a comparative example.

As a comparative example, a test workpiece 101 was heated and brazed in the furnace without being sandwiched between the first heating plate and the second heating plate. The relationships between temperature and time at corners A, B, C and D of the test workpiece 101 were compared between the example and the comparative example. As a result, as shown in FIG. 16, it was found that the corners A, B, C, and D of the test workpiece 101 of the example were heated faster and the test workpiece of the example had a smaller temperature variation than the test workpiece 101 of the comparative example.

Figure 17:
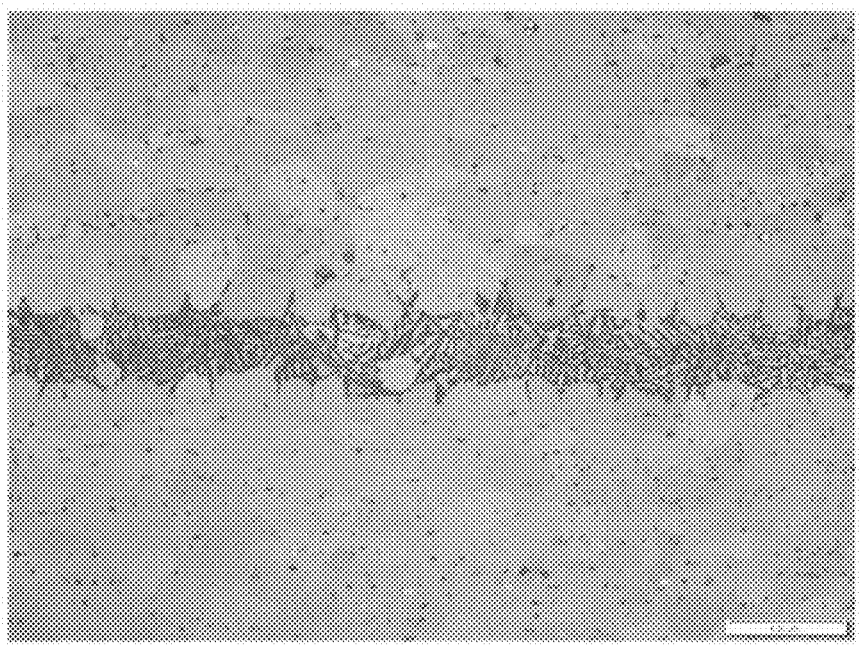
FIG. 17 is an image showing how a brazing material of the example was diffused into a first metal plate and a second metal plate.
Figure 18:
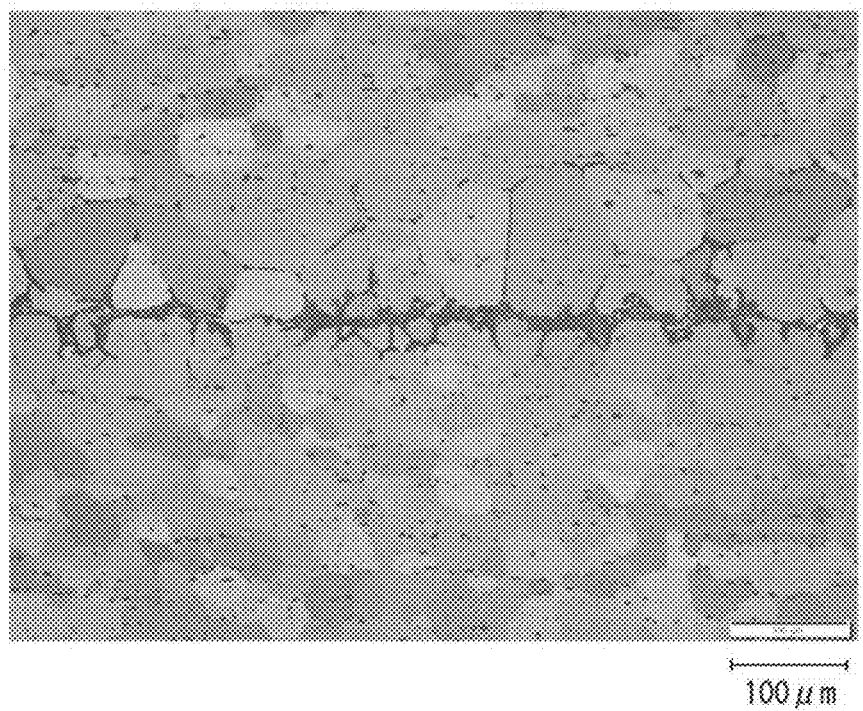
FIG. 18 is an image showing how a brazing material of the comparative example was diffused into the first metal plate and the second metal plate.

Diffusion of the brazing material into the first metal plate and the second metal plate was also compared between the example and the comparative example. FIG. 17 is an image showing how the brazing material of the example was diffused into the first metal plate and the second metal plate. FIG. 18 is an image showing how the brazing material of the comparative example was diffused into the first metal plate and the second metal plate.

It was found from comparison between FIGS. 17 and 18 that the diffusion of the brazing material of the example into the first metal plate and the second metal plate was less than that of the brazing material of the comparative example into the first metal plate and the second metal plate. Grain coarsening near the brazed portion was also reduced as compared to the comparative example.

Figure 19:
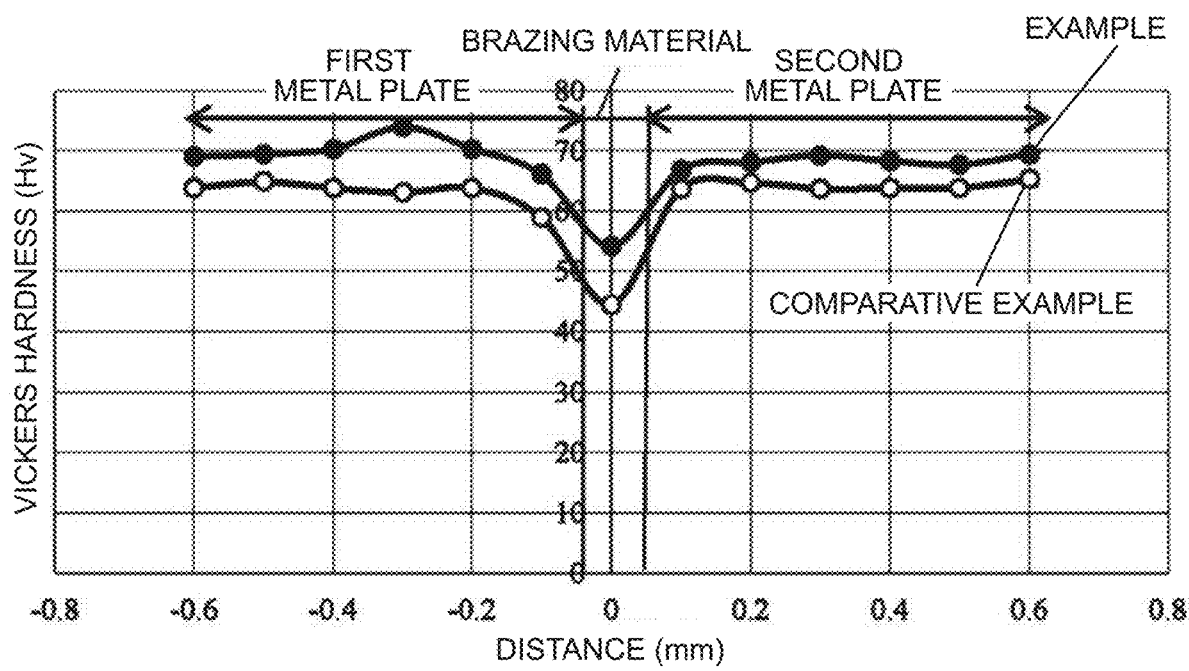
FIG. 19 is a graph showing the hardnesses of the first and second metal plates after brazing of the example and the comparative example.

Hardnesses of the first and second metal plates after brazing were also compared between the example and the comparative example. As is clear from FIG. 19, it was found that the first and second metal plates of the example were harder than the first and second metal plates of the comparative example.

Figure 20:
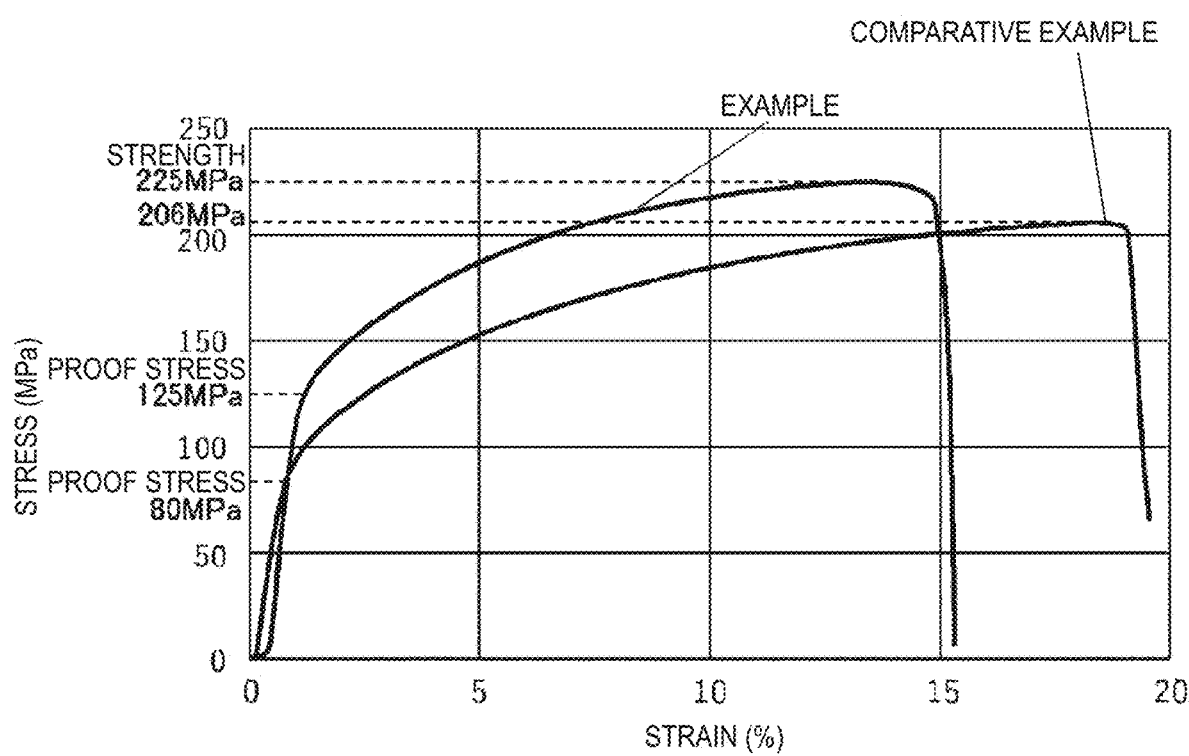
FIG. 20 is a graph showing the tensile strength of the test workpiece after brazing of the example and the comparative example.

The tensile strength of the test workpiece 101 after brazing was also compared between the example and the comparative example. As is clear from FIG. 20, it was found that the test workpiece 101 of the example had higher tensile strength after brazing than the test workpiece 101 of the comparative example.

It was found from these comparison results that the first and second metal plates of the example were exposed to high temperatures for a shorter time during brazing than the first and second metal plates of the comparative example, and the temperature variation was smaller in the example than in the comparative example, and therefore brazing of the example provided higher hardness and tensile strength than brazing of the comparative example.

The present disclosure is not limited to the above embodiments, and can be modified as appropriate without departing from the spirit and scope of the present disclosure.

For example, although the brazing apparatuses of the above embodiments include the preliminary chamber 11, the cooling chamber 18, etc., the preliminary chamber 11, the cooling chamber 18, etc. may be omitted. In other words, the brazing method and brazing apparatus of the present disclosure need only be configured to, in the heating chamber 13 controlled to the preset oxygen concentration or less, sandwich the workpiece 5 that is a stack of the first metal plate 2 and the second metal plate 3 with the brazing material 4 interposed therebetween between the first heating plate 14a and the second heating plate 14b in such a manner that the first heating plate 14a and the second heating plate 14b cover the entire workpiece 5 as viewed in the thickness direction of the workpiece 5, and heat the workpiece 5 to braze the first metal plate 2 and the second metal plate 3 together via the brazing material 4.

For example, the shapes of the first heating plate 14a, the second heating plate 14b, the first cooling plate 19a, and the second cooling plate 19b in the above embodiments are illustrative. Each of the first heating plate 14a, the second heating plate 14b, the first cooling plate 19a, and the second cooling plate 19b may have such a shape that it can be in surface contact with the workpiece 5 or the restraining jig 32. The shapes of the first heating plate 14a, the second heating plate 14b, the first cooling plate 19a, and the second cooling plate 19b can be changed as appropriate according to the shape of the workpiece 5 or the restraining jig 32. For example, although the brazing apparatus 1 of the first embodiment does not include the positioning unit 33, the brazing apparatus 1 may include the positioning unit 33.

What is claimed is:

1. A brazing apparatus for brazing metal plates together via a brazing material, the brazing apparatus comprising:
   a heating chamber into which a workpiece is loaded, the workpiece including metal plates that are stacked via the brazing material;
   a first deoxidizing device configured to remove oxygen from the heating chamber; and
   a first heating plate and a second heating plate that are located inside the heating chamber, wherein
   the brazing apparatus is configured to, with the heating chamber controlled to a preset oxygen concentration or less, sandwich the workpiece between the first heating plate and the second heating plate in such a manner that the first heating plate and the second heating plate cover the workpiece entirely as viewed in a thickness direction of the workpiece, and heat the workpiece to braze the metal plates together via the brazing material; and
   wherein the brazing apparatus further comprises:
      a preliminary chamber that is continuous with the heating chamber;
      a first opening and closing unit located between the preliminary chamber and the heating chamber;
      a second deoxidizing device configured to remove oxygen from the preliminary chamber; and
      a conveying device configured to convey the workpiece, wherein
      the brazing apparatus is configured to, with both the preliminary chamber in which the workpiece is loaded and the heating chamber controlled to the preset oxygen concentration or less, open the first opening and closing unit to load the workpiece into the heating chamber.

2. The brazing apparatus according to claim 1, further comprising:
   a cooling chamber that is located on an opposite side of the heating chamber from the preliminary chamber and into which the brazed workpiece is loaded;
   a second opening and closing unit located between the heating chamber and the cooling chamber; and
   a first cooling plate and a second cooling plate that are located inside the cooling chamber, wherein
   the brazing apparatus is configured to sandwich the workpiece between the first cooling plate and the second cooling plate in such a manner that the first cooling plate and the second cooling plate cover the workpiece entirely as viewed in the thickness direction of the workpiece, and cool the workpiece.

3. The brazing apparatus according to claim 1, wherein each of the first heating plate and the second heating plate includes a single-piece formed graphite plate and a heater mounted inside the graphite plate.

4. The brazing apparatus according to claim 1, further comprising a holding unit located inside the heating chamber and configured to hold both end portions of the workpiece, the both end portions of the workpiece being end portions in a direction perpendicular to the thickness direction of the workpiece and perpendicular to a direction in which the workpiece is loaded into the heating chamber, wherein
   when the holding unit holds the both end portions of the workpiece, the workpiece is placed between the first heating plate and the second heating plate without contacting the first heating plate and the second heating plate.

5. The brazing apparatus according to claim 1, further comprising a positioning unit configured to position the workpiece inside the heating chamber.

6. The brazing apparatus according to claim 1, further comprising a first restraining plate and a second restraining plate that are configured to sandwich and restrain the workpiece between the first restraining plate and the second restraining plate, wherein
   with the workpiece sandwiched between the first restraining plate and the second restraining plate, the first restraining plate and the second restraining plate are loaded into the heating chamber.

7. The brazing apparatus according to claim 6, wherein the first restraining plate and the second restraining plate have a thermal conductivity equal to or greater than a thermal conductivity of iron and a heat capacity equal to or greater than a heat capacity of aluminum.

* * * * *